(12) United States Patent
Yamashita et al.

(10) Patent No.: US 6,618,341 B1
(45) Date of Patent: Sep. 9, 2003

(54) DISK LOADING DEVICE HAVING A DRIVE MECHANISM TO MOVE A DISK RETAINING MEMBER ADJACENT TO A DISK INSERTION SLOT

(75) Inventors: Norio Yamashita, Tokorozawa (JP); Mitsunobu Sato, Tokorozawa (JP); Ryou Yoshitomi, Higashiosaka (JP)

(73) Assignee: TEAC Corporation, Tokyo (JP)

( * ) Notice: Subject to any disclaimer, the term of this patent is extended or adjusted under 35 U.S.C. 154(b) by 0 days.

(21) Appl. No.: 09/724,103

(22) Filed: Nov. 28, 2000

(30) Foreign Application Priority Data

| Dec. 3, 1999 | (JP) | ............................................. 11-345506 |
| Oct. 24, 2000 | (JP) | ........................................ 2000-324397 |
| Nov. 24, 2000 | (JP) | ........................................ 2000-358387 |

(51) Int. Cl.[7] .............................................. G11B 33/02
(52) U.S. Cl. ..................................................... 369/77.1
(58) Field of Search ....................................... 369/77.1

(56) References Cited

U.S. PATENT DOCUMENTS

| 4,695,996 | A | * | 9/1987 | Sugihara et al. ............ 369/77.1 |
| 4,890,276 | A | * | 12/1989 | Ono et al. ................... 369/77.2 |
| 4,979,160 | A | * | 12/1990 | Araki ......................... 369/77.1 |
| 4,995,027 | A | * | 2/1991 | Aoyagi et al. ............... 369/77.1 |
| 5,136,570 | A | * | 8/1992 | Takai et al. ................. 369/77.1 |
| 5,150,349 | A | * | 9/1992 | Takai et al. ................. 369/75.2 |
| 5,195,077 | A | * | 3/1993 | Ishikawa et al. ............ 369/75.2 |
| 5,255,255 | A | * | 10/1993 | Kaneda et al. .............. 369/77.1 |
| 5,878,011 | A | * | 3/1999 | Nakamichi ................... 369/77.1 |
| 6,052,351 | A | * | 4/2000 | Yamashita et al. .......... 369/75.2 |
| 6,256,280 | B1 | * | 7/2001 | Sakurai et al. .............. 369/77.1 |
| 6,292,452 | B1 | * | 9/2001 | Endo et al. .................. 369/75.2 |

FOREIGN PATENT DOCUMENTS

JP 10-021620 1/1998

* cited by examiner

Primary Examiner—George J. Letscher
Assistant Examiner—Christopher R. Beacham
(74) Attorney, Agent, or Firm—Anderson Kill & Olick, P.C.; Eugene Lieberstein; Michael N. Meller

(57) ABSTRACT

A disk loading device includes a slot into which a disk-like recording medium is inserted, a retaining member that retains the disk-like recording medium inserted from the slot, a moving member that moves the retaining member so as to retract the disk-like recording medium in a disk insert direction during insertion and expel the disk-like recording medium in a disk eject direction during ejection, and a drive mechanism that, after the disk-like recording medium has moved to an eject position, drives the moving member from the eject position further in the eject direction so as to bring the retaining member adjacent to the slot as the disk-like recording medium is withdrawn from the slot.

5 Claims, 20 Drawing Sheets

DISK LOADING DEVICE HAVING A DRIVE MECHANISM TO MOVE A DISK RETAINING MEMBER ADJACENT TO A DISK INSERTION SLOT

BACKGROUND OF THE INVENTION

1. Field of the Invention

The present invention relates generally to a disk loading device, and more particularly, to an improved slot-in type disk loading device for directly inserting and removing a disk-like recording medium.

2. Description of the Related Art

In a disk unit such as for example a CD-ROM device, in which information is recorded and/or reproduced (hereinafter recorded and reproduced) to and from a disk-like recording medium (hereinafter a disk), a disk loading device is provided to both load and eject the disk. These disk loading devices are of two types: a tray type, in which the disk rests on a tray and the tray is moved back and for the to load and eject the disk, and a slot-in type, in which the disk is directly inserted into and ejected from the unit.

In the case of the tray type disk loading device, racks are formed on the floor and sides of the tray. A motor drives a pinion that engages the racks so as to move the tray to an eject position or a loading position as the case may be.

In the case of the slot-in type disk loading device, a roller located on the inside of the slot is supported by a loading arm and retains the disk in place. When the loading arm rotates in a direction that inserts the disk into the unit, the disk moves to a predetermined loading position. To eject the disk from the unit, the loading arm rotates in an eject direction and expels the disk from the slot.

The eject position at which the loading arm ejects the disk is a position at which the disk sticks halfway out the insertion slot, that is, the disk does not fall from the slot. Accordingly, if the disk exceeds the eject position and extends from the insertion slot, then the disk may fall from the slot.

Accordingly, the roller provided at the tip of the loading arm is such that the ejection completion position is at a distance from the insertion slot that is essentially identical to the radius of the disk. Then, after ejection, when the next disk is inserted into the insertion slot, inserting the disk horizontally means that the inserted edge of the disk is supported by the roller and the loading arm loading operation transports the disk to a loading position.

In the conventional disk loading device, the loading arm completes ejection when substantially half the disk protrudes from the insertion slot, so the eject position is at a distance from the insertion slot that is essentially identical to the radius of the disk. For this reason, conventionally, when the disk is inserted into the insertion slot, the distance to the point at which the inserted edge of the disk is retained by the roller provided at the tip of the loading arm is relatively long.

As a result, in the conventional disk loading device, when the disk is inserted into the insertion slot the distance between the inside of the slot and the roller is long, which makes it difficult to insert the disk in a horizontal plane because the disk has a tendency to droop downward at the insertion edge.

If, for example, the disk is inserted in such downward-slanting state, then there is the danger that the inserted edge of the disk will pass below the roller and hence fail to be supported by the roller, resulting in an inability to load the disk.

SUMMARY OF THE INVENTION

Accordingly, it is an object of the present invention to provide an improved and useful disk loading device in which the above-described disadvantage is eliminated.

The above-described object of the present invention is achieved by a disk loading device comprising:

a slot into which a disk-like recording medium is inserted;

a retaining member that retains the disk-like recording medium inserted from the slot;

a moving member that moves the retaining member so as to retract the disk-like recording medium in a disk insert direction during insertion and expel the disk-like recording medium in a disk eject direction during ejection; and a drive mechanism that, after the disk-like recording medium has moved to an eject position, drives the moving member from the eject position further in the eject direction so as to bring the retaining member adjacent to the slot as the disk-like recording medium is withdrawn from the slot.

According to this aspect of the invention, at the same time as the disk is removed from the insertion slot, the moving member is driven from the eject position further in the eject direction so as to bring the the inserted leading edge of the inserted disk can be supported at a position relatively close to the insertion slot, which means that when the disk is inserted the inserted leading edge of the disk can be supported and held level before it has a chance to slant downward. As a result, the ease and stability with which the disk is properly inserted into the unit can be improved.

Additionally, the above-described object of the present invention is achieved by the disk loading device as described above, wherein the retaining member comprises:

a first roller that supports an insertion-side edge portion of the disk-like recording medium;

a second roller that supports an ejection-side edge portion of the disk-like recording medium; and a third roller that supports an edge portion of the disk-like recording medium on a side other than the ejection side.

Additionally, the above-described object of the present invention is achieved by the disk loading device as described above, wherein the moving member comprises a first loading arm that supports the first roller;

a second loading arm that supports the second roller; and a third loading arm that supports the third roller.

According to these aspects of the invention, the disk can be supported from three directions at once.

Additionally, the above-described object of the present invention is achieved by the disk loading device as described above, wherein the drive mechanism, after the disk-like recording medium has moved to the eject position, drives at least the first loading arm from the eject position further in the eject direction so as to bring the retaining member adjacent to the slot as the disk-like recording medium is withdrawn from the slot.

According to this aspect of the invention, the inserted leading edge of the disk can be supported at a point relatively close to the inside of the insertion slot, and as a result, the ease and stability with which the disk is properly inserted into the unit can be improved.

Additionally, the above-described object of the present invention is also achieved by a disk drive unit comprising:

a slot into which a disk-like recording medium is inserted;

a retaining member that retains the disk-like recording medium inserted from the slot;

a moving member that moves the retaining member so as to retract the disk-like recording medium in a disk insert direction during insertion and expel the disk-like recording medium in a disk eject direction during ejection;

a turntable that clamps and rotates the inserted disk-like recording medium; and a pick-up that reads information recorded on the disk-like recording medium rotated by the turntable, the disk drive unit having a drive mechanism that, after the disk-like recording medium has moved to the eject direction, drives the moving member from the eject position further in the eject direction so as to bring the retaining member adjacent to the slot as the disk-like recording medium is removed from the slot.

Other objects, features and advantages of the present invention will become apparent from the following detailed description when read in conjunction with the accompanying drawings.

BRIEF DESCRIPTION OF THE DRAWINGS

FIGS. 20A, 20B and 20C are diagrams illustrating the structure and operation of the second loading arm, in which FIG. 20A is a plan view of the guide arm and retention arm in a disassembled state, FIG. 20B is a plan view of the second loading arm in a state in which the disk is loaded, and FIG. 20C is a plan view of the second loading arm in a state in which the disk is ejected.

DETAILED DESCRIPTION OF THE INVENTION

A detailed description will now be given of a disk loading device according to the present invention, with reference to the accompanying drawings. It should be noted that identical or corresponding elements are given identical or corresponding reference numbers in all drawings, with detailed descriptions thereof given once and thereafter omitted.

Figure 1:
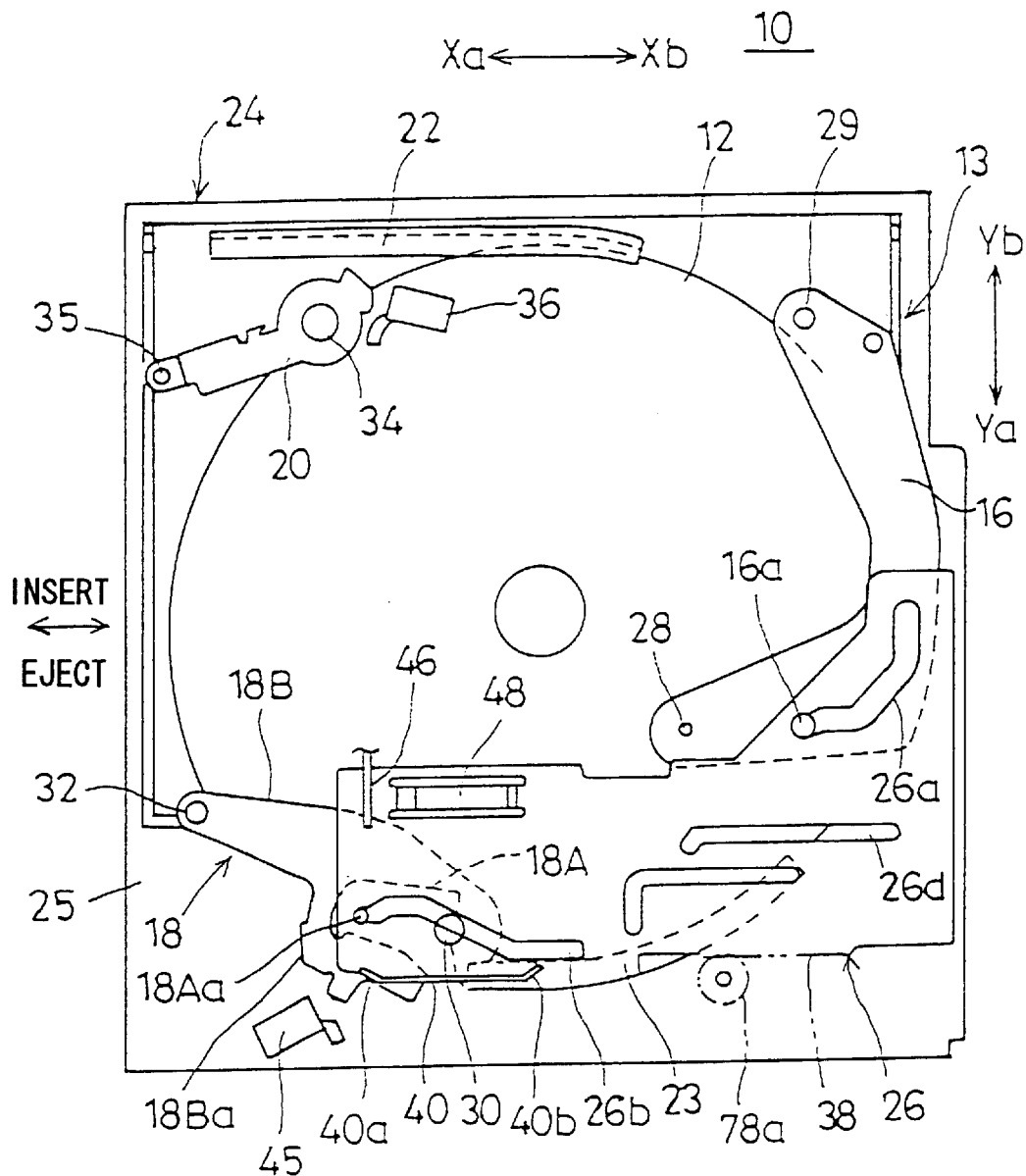
FIGS. 1A and 1B are diagrams showing a plan view of a disk unit according to one embodiment of the present invention and a positional relation of the main slider and the detection switch, respectively.

FIGS. 1A and 1B are diagrams showing a plan view of a disk unit according to one embodiment of the present invention and a positional relation of the main slider and the detection switch, respectively.

As shown in FIGS. 1A and 1B, the disk loading device 10 is the so-called slot-in type, in which the disk 12 is inserted directly, having an autoloading mechanism 13 such that when the disk 12 has been inserted halfway the disk 12 is withdrawn automatically into the unit to a loading position, and, after having once been loaded, the disk 12 is ejected by being expelled to a position at which the disk 12 extends halfway out the unit.

The auto-loading mechanism 13 comprises first, second and third loading arms 16, 18 and 20 provided on a floor of a chassis 24 (the chassis 24 best seen in FIG. 2), disk guides 22, 23 to guide the disk 12 into position from both sides of the disk 12, a frame 25 that supports the disk guides 22, 23, and a main slider 26 (moving member) that drives the first and second loading arms 16 and 18.

The first loading arm 16 (moving member) is rotatably supported about a shaft 28 and has a retention pin 16a that engages a cam groove 26a of the main slider 26. A first roller 29 that holds a periphery of the disk 12 is rotatably supported on a tip of the first loading arm 16. It should be noted that the first roller 29 is formed with a substantially V-shaped slot that accommodates a periphery of the disk 12.

Figure 20A:
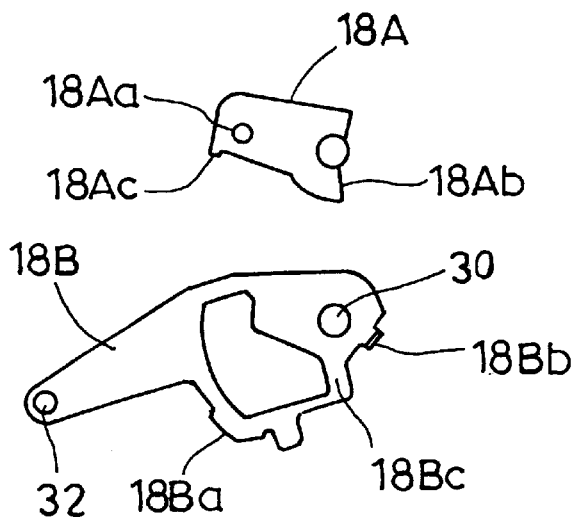
Figure 20B:
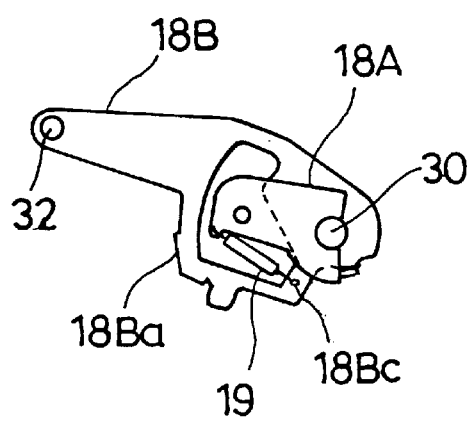
Figure 20C:
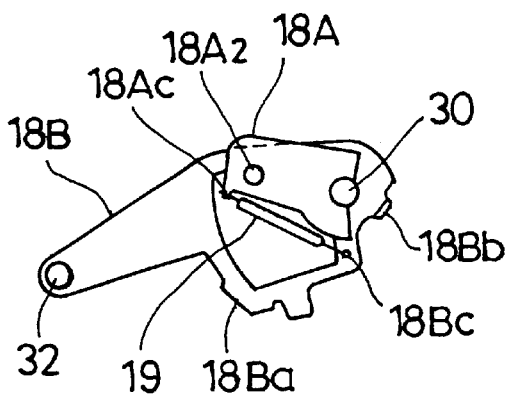

FIGS. 20A, 20B and 20C are diagrams illustrating the structure and operation of the second loading arm, in which FIG. 20A is a plan view of the guide arm and retention arm in a disassembled state, FIG. 20B is a plan view of the second loading arm in a state in which the disk is loaded, and FIG. 20C is a plan view of the second loading arm in a state in which the disk is ejected.

The second loading arm 18, as shown in FIGS. 20A, 20B and 20C, comprises guide arm 18A and retention arm 18B. The guide arm 18A is rotatably supported by a shaft 30 and is provided with an engaging pin 18Aa that fits into a cam groove 26b of the main slider 26. In addition, the retention arm 18B, like the guide arm 18A, is rotatably supported by a shaft 30. A second roller 32 that holds an exit-side periphery of the disk 12 is rotatably supported on a tip of the retention arm 18B.

The guide arm 18A is further provided with a spring engaging portion 18Ac and the retention arm 18B is further provided with a spring engaging portion 18Bc. A coil spring 19 is attached between the spring engaging portion 18Ac and the spring engaging portion 18Bc, so as to urge the retention arm 18B in a clockwise direction with respect to the guide arm 18A. Additionally, a contact portion 18Bb of the retention arm 18B contacts a stopper portion 18Aa of the guide arm 18A, as a result of which the clockwise rotation of the retention arm 18B is restricted. A detection switch 45 (seen for example in FIG. 10A) is turned OFF prior to the insertion of the disk 12, with the retention arm 18B impelled in a counter-clockwise direction by the insertion of the disk 12.

Figure 9A:
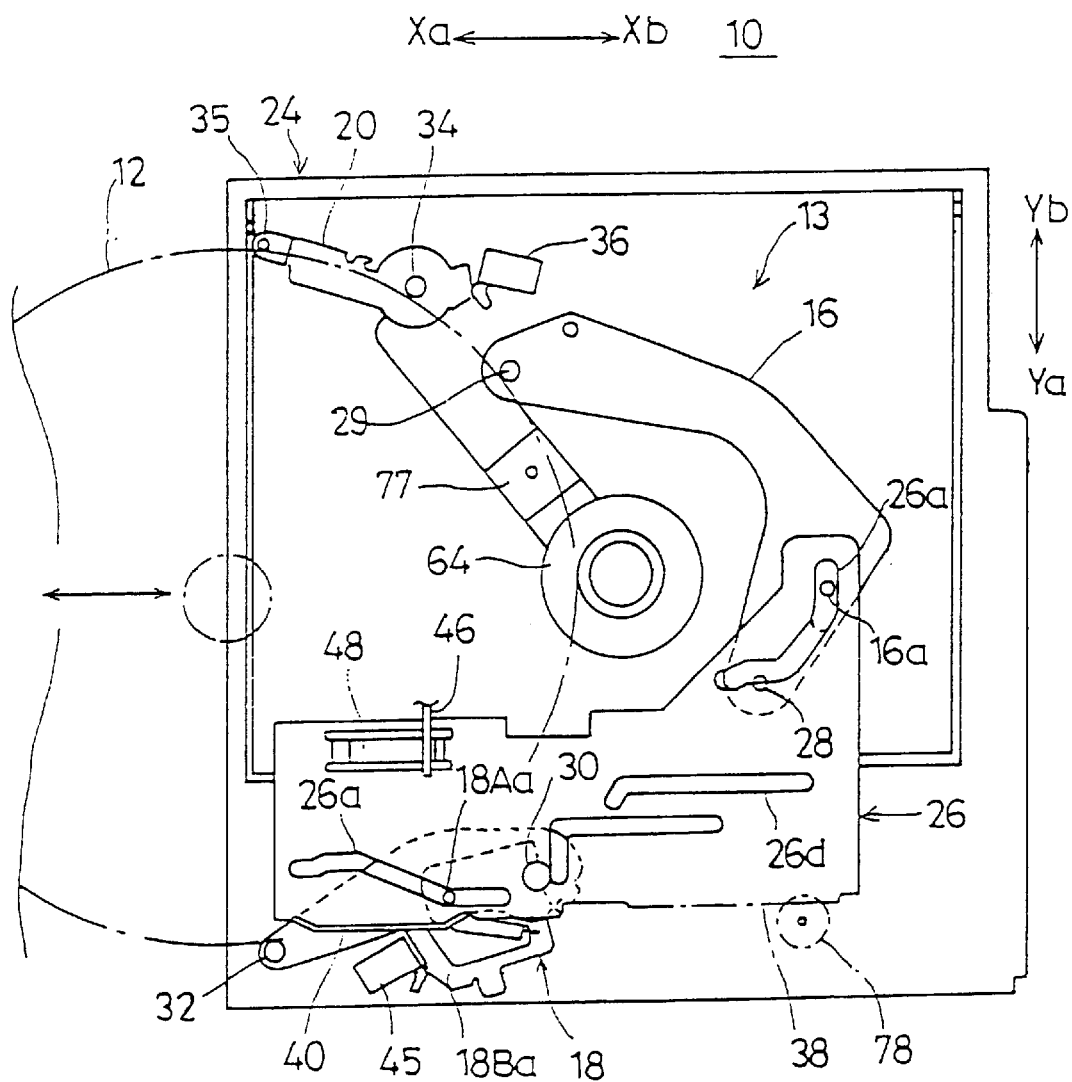
FIGS. 9A and 9B show a plan view of a disk eject state and a positional relation of the main slider and the detection switch, respectively.

The third loading arm 20 is rotatably supported by a shaft 34, and is impelled in the counter-clockwise direction by a torsion spring not shown in the diagram. A third roller 35 that holds the exit-side periphery of the disk 12 is rotatably supported on a tip of the third loading arm 20. Additionally, the third loading arm 20, when rotated clockwise by the insertion of the disk 12, turns the first detection switch 36 ON (as can be seen in FIG. 9A). The first detection switch 36 is turned OFF when the disk is withdrawn by an eject operation (see FIG. 10A).

Additionally, the main slider 26 is slidably supported atop the chassis 24 in such a way as to be slidable in a direction indicated by double-headed arrow Xa–Xb in FIG. 1A, and is further provided with a rack 38 (shown by a double-dash-and-chain line in FIG. 1A) that engages a drive gear 78a (indicated by a double-dot-and-chain line) of a second gear unit 78.

Additionally, the main slider 26, in order to detect a position to which it has moved in the Xa–Xb direction, has a cam plate 40. A second detection switch 42 and a third detection switch 44 are provided atop the chassis 24 and are turned ON and OFF by the movement of the cam plate 40. Slanted flanges 40a, 40b are provided at either end of the cam plate 40 in order to smooth the press of the cam plate 40 against the detection switches 42, 44.

As shown in FIG. 1B, when the disk 12 is loaded the cam plate 40 separates from the second and third detection switches 42, 44. Therefore, the second and third detection switches 42, 44 are turned OFF during loading of the disk 12.

Additionally, as will be described later, the main slider 26 has an angular cam 48 that slidingly contacts a clamp holder pin 46. The angular cam 48 presses the clamp holder pin 46 and raises the clamp when the main slider 26 slides in the Xa direction with the disk insertion and disk ejection.

Figure 2:
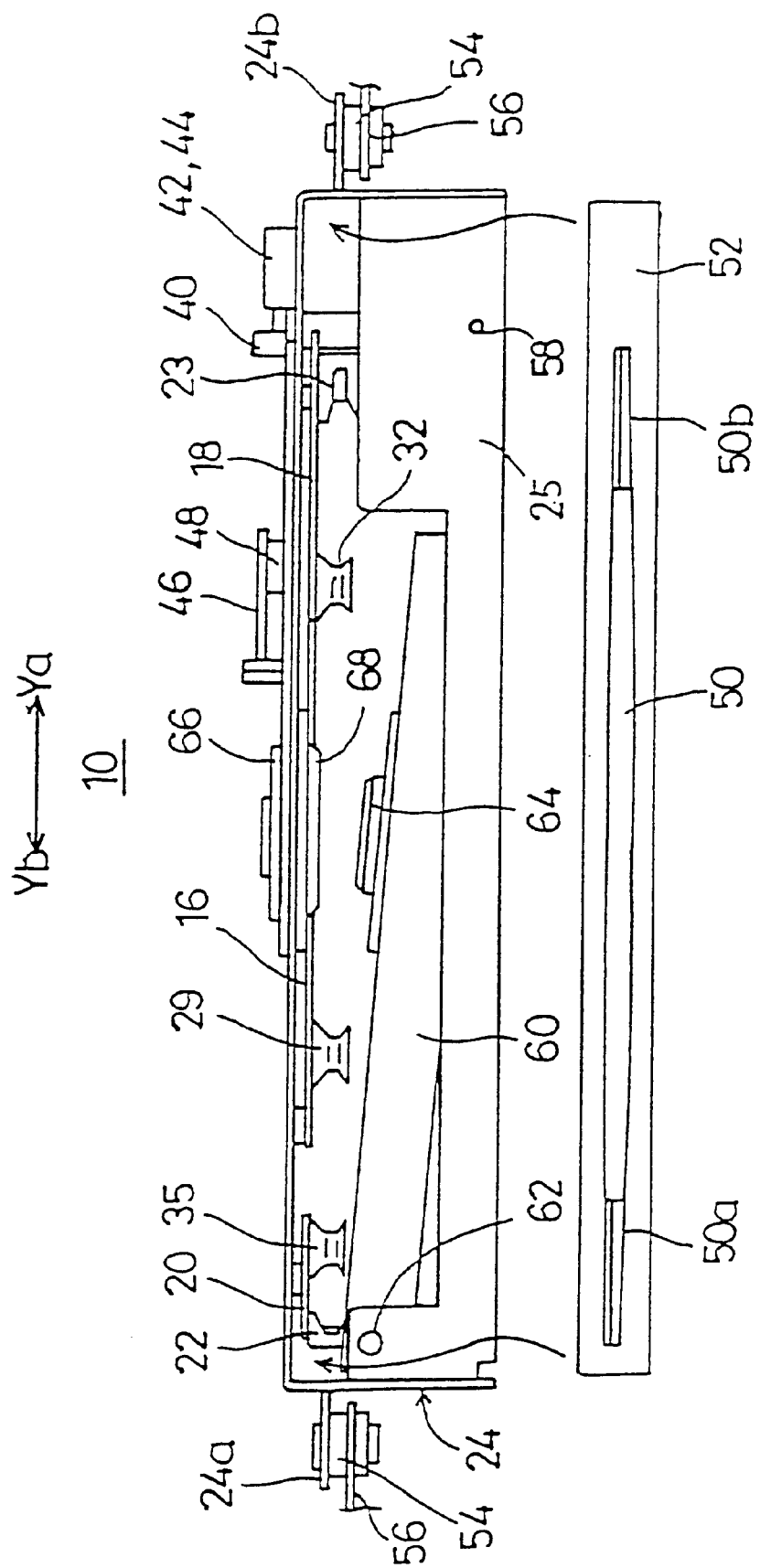
FIG. 2 is a front view of the disk loading device.

FIG. 2 is a front view of the disk loading device.

As shown in FIG. 2, the disk loading device 10 comprises a slit plate 52 having a disk insertion slot 50 (hereinafter insertion slot), the slit plate 52 being mounted to the chassis 24 as shown in the arrows. It should be noted that the insertion slot 50 is wider at an intermediate portion than at either left and right lateral ends thereof. Additionally, the insertion slot 50 is provided with felt portions 50a, 50b at either left and right lateral ends thereof.

Disk guides 22 and 23 and first roller 29, second roller 32 and third roller 35 are located at the height at which the disk insertion slot 50 is located.

Mounting portions 24a, 24b protruding from both sides of the chassis 24 are fixedly mounted to brackets 56 via insulator rubber 54. An emergency hole 58 to be used during power outages and other emergencies is provided on a front surface of a frame 25 installed on the interior of the chassis 24.

Additionally, a shaft 62 of a sub-chassis 60 is rotatably supported by the frame 25. A turntable 64 that rotatably drives the disk 12 is provided on the sub-chassis 60. Before the disk 12 is inserted the sub-chassis 60 rotates clockwise and the turntable 64 descends.

A clamper 68 supported by the clamper holder 66 is disposed opposite to and above the turntable 64. The clamper holder 66, which has the clamper holder pin 46 described above, is raised by the movement of the angular cam 48. Prior to the insertion of the disk 12, the clamper holder 66 is rotated so as to raise the clamper 68.

Figure 3:
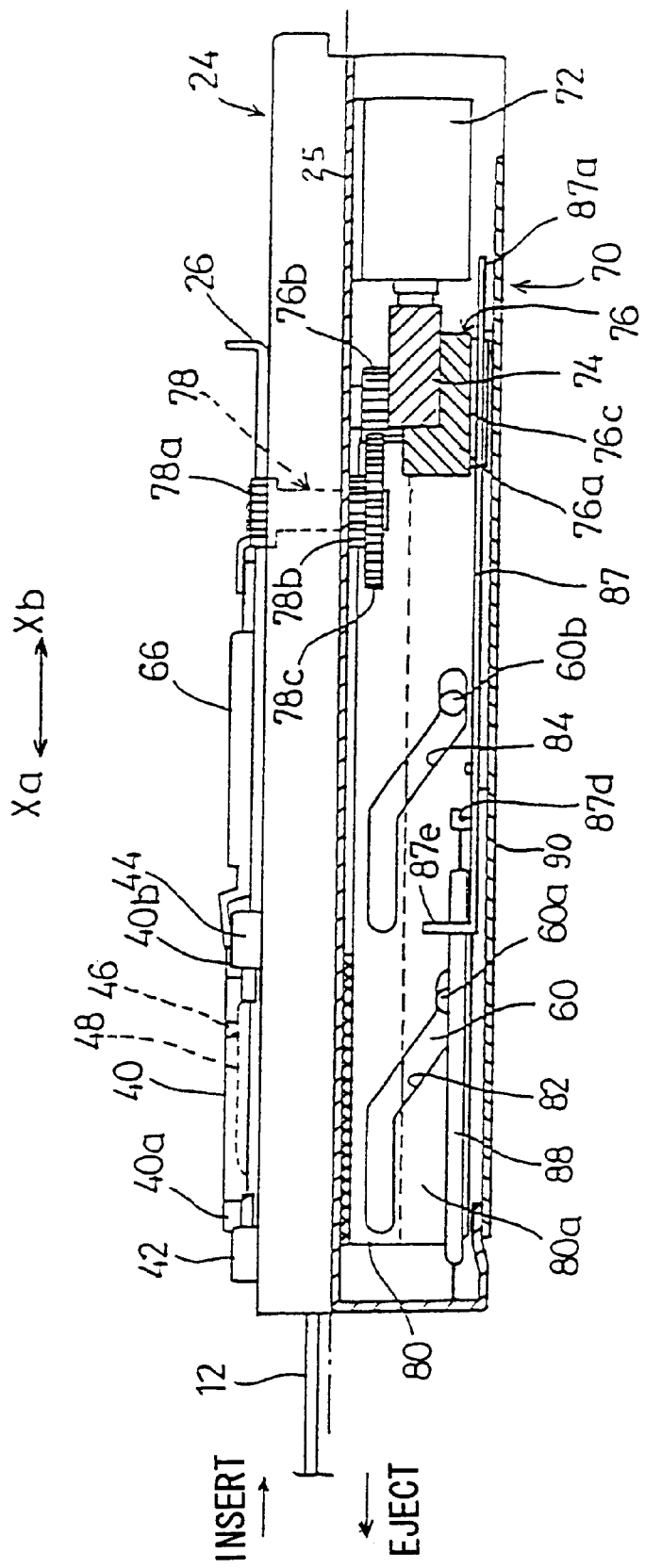
FIG. 3 is a cross-sectional view of a lower half of the disk loading device.
Figure 4:
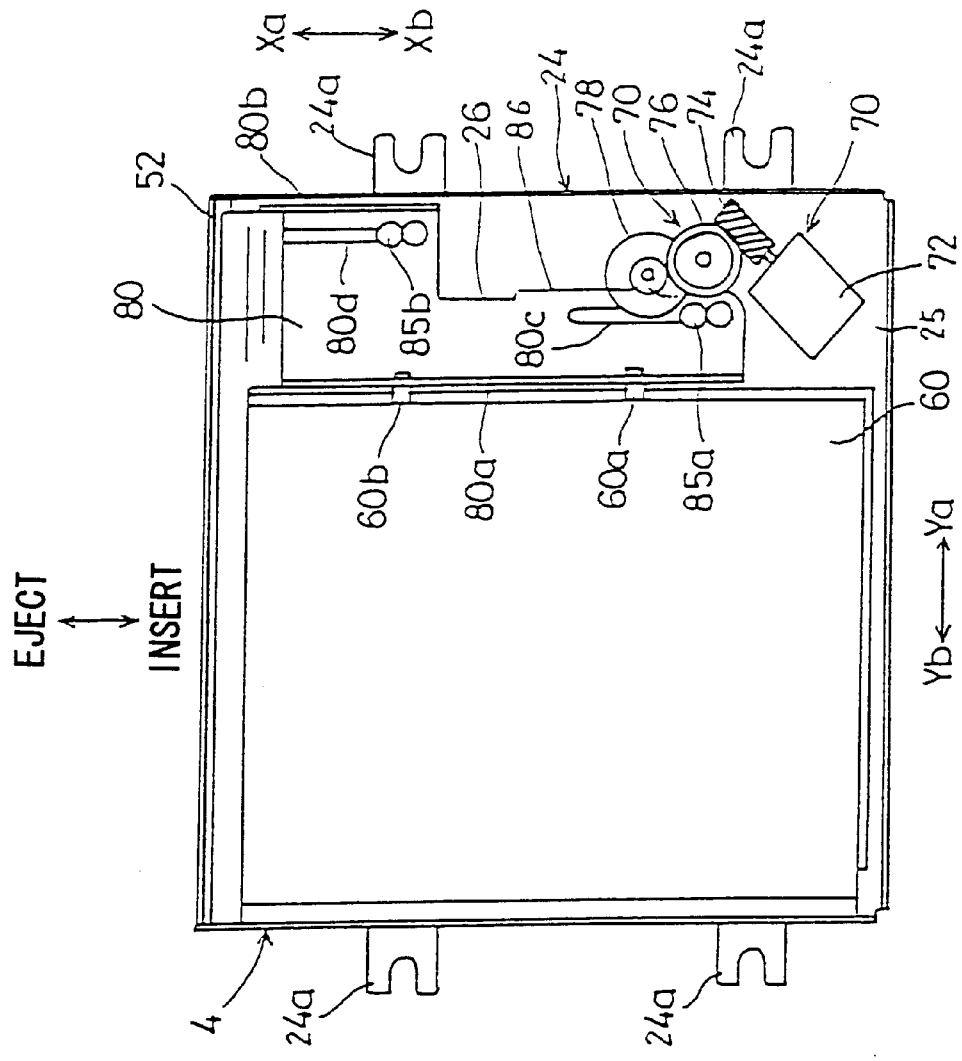
FIG. 4 is a bottom view of the disk loading device.
Figure 5:
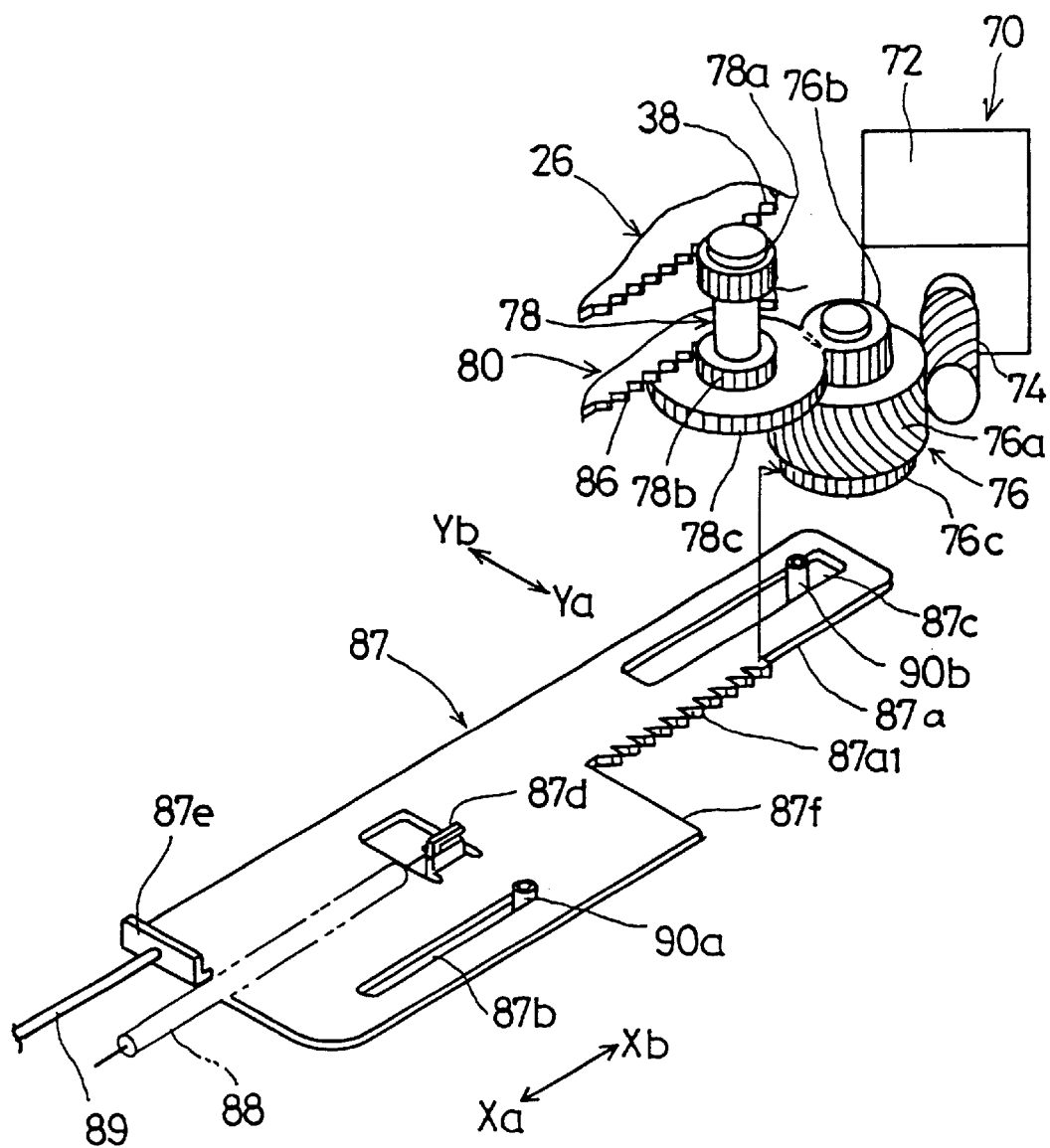
FIG. 5 is a perspective view of the drive mechanism and manual elect mechanism according to one embodiment of the present invention.

FIG. 3 is a cross-sectional view of a lower half of the disk unit 10. FIG. 4 is a bottom view of the disk unit 10. FIG. 5 is a perspective view of the drive mechanism and manual eject mechanism according to one embodiment of the present invention.

As shown in FIGS. 3, 4 and 5, a drive mechanism 70 is provided on a lateral portion of the frame 25, the drive mechanism 70 serving to drive the arms 16, 18, the sub-chassis 60 and the damper holder 66 in such a way as to load the disk 12.

The drive mechanism 70 comprises a motor 72, a worm gear 74 rotatably driven by the motor 72, a first gear unit 76 having a worm wheel 76a that meshes with the worm gear 74, and a second gear unit 78 having a large-diameter gear 78c that engages a small-diameter gear 76b of the first gear unit 76.

A sub-slider 80 that raises the sub-chassis 60 is supported by side walls of the frame 25 so as to be slidable in the Xa–Xb direction. Crank-shaped cam grooves 82, 84 that engage the pair of pins 60a, 60b which project from the edge of the sub-chassis 60 are formed in a first side wall 80a of the sub-slider 80.

An upper surface of the sub-slider 80 is provided with guide grooves 80c, 80d that extend in the Xa–Xb direction. The guide grooves 80c, 80d engage pins 85a, 85b that project from the frame 25 and restrict the sliding of the sub-slider 80. Additionally, the sub-slider 80 has a rack 86 that engages the small-diameter gear 78b of the second gear unit 78.

It should be noted that the sub-slider 80 is driven by a sub-slider drive mechanism (not shown in the diagram) comprising a linkage connected to the main slider 26 between the time ejection begins and the clamp is released, thus causing the rack 86 to engage the small-diameter gear 78b of the second gear unit 78. Accordingly, the sub-slider 80 is driven by the second gear unit 78 only from the time ejection begins until the time the clamp is released.

As a result, when the rotary motion of the motor 72 is transmitted to the sub-slider 80 via the first and second gear units 76, 78, the sub-slider 80 is moved in either the Xa or the Xb direction. Accordingly, when the disk 12 is inserted with the unit in the standby state shown in FIG. 3, the sub-slider 80 is driven in the Xb direction and the pins 60a, 60b of the sub-chassis 60 are driven upward along the cam grooves 82, 84, so the sub-chassis 60 moves upward and contacts the turntable 64 to a lower surface of the disk 12.

Additionally, as described above, the drive gear 78a of the second gear unit 78 engages the rack 38 of the main slider 26 and the main slider 26 is slid back and forth in the Xa–Xb direction described above via the second gear unit 78.

By sliding the main slider 26 in the Xb direction, the damper holder pin 46 of the damper holder 66 passes through the angular cam 48 and the damper 68, which is supported by the damper holder 66, descends to a disk clamp position. In so doing, the disk 12 is clamped firmly between the turntable 64 and the damper 68, so that information recorded on a recording surface of the disk can be reproduced by the optical pick-up 77.

Additionally, an eject slider 87 capable of sliding back and forth in the Xa–Xb direction by manual operation during a power outage or other such emergency is provided on a top surface of a floor plate of the chassis 24, at a point opposite a bottom of the sub-slider 80. The eject slider 87 has an extension 87a that extends in the Xb direction from a left lateral side of the eject slider 87, with a side portion of the extension 87a having a rack 87a1.

When the eject slider 87 is pushed in the Xb direction, the rack 87a1 engages an emergency gear 76c provided on a lower edge of the first gear unit 76 The eject slider 87 has guide grooves 87b, 87c (seen for example in FIG. 14) into which a pair of bosses 90a, 90b projecting upward from the bottom chassis 90 are inserted. The guide grooves 87b, 87c each extend back and forth in the Xa–Xb direction, and by engaging the bosses 90a, 90b guide the eject slider 87 in the Xa–Xb direction.

In addition, guide groove 87b is formed so as to be wider than an outer periphery of the boss 90a, so the eject slider 87 can move essentially free of friction. Moreover, the other guide groove 87c is also formed so as to be wider than an outer periphery of the boss 90b, so that the eject slider 87 can slide in a state in which it is also possible for the eject slider 87 to oscillate in a Ya–Yb direction that is perpendicular to the sliding direction Xa–Xb.

Additionally, the eject slider 87 has a spring retention portion 87d that retains one end of a coil spring 88, so that the spring force of the coil spring 88 impels the eject slider 87 in the in the Xa direction. As a result, the eject slider 87 is ordinarily moved in the Xa direction, with the rack 87a1 withdrawn to a position at which it does not engage the emergency gear 76c of the first gear unit 76.

Additionally, the eject slider 87 is provided with the guide groove 87b on a Yb side thereof and the guide groove 87c on the Ya side thereof. Further, the eject slider 87 is configured so that the spring retention portion 87d is located at a position intermediate between Ya- and Yb-direction ends thereof, with the manual eject button 87e provided on a Ya side thereof.

When a press portion 87e provided at a Ya side of the eject slider is pressed in the Xb direction by a manual eject emergency pin 89 to be described later, the fact that the width of the guide groove 87c is larger than the periphery of the boss 90b causes the eject slider 87 to swing in the clockwise direction around the boss 90a (see FIGS. 11, 12).

In so doing, when the emergency pin 89 pressure acts on the press portion 87e provided on the Ya side of the eject slider, the eject slider 87 slides in the Xb direction and the rack 87a1 rotates in the Yb direction so as to engage the first gear unit 76 emergency gear 76c. If the press portion 87e is further pressed in the Xb direction in such state of engagement, then the rack 87a1 slides in the Xb direction, at the same time rotating the small-diameter gear 76b of the first gear unit 76 and rotatably driving the second gear unit 78 in the eject direction (see FIG. 13).

Figure 6:
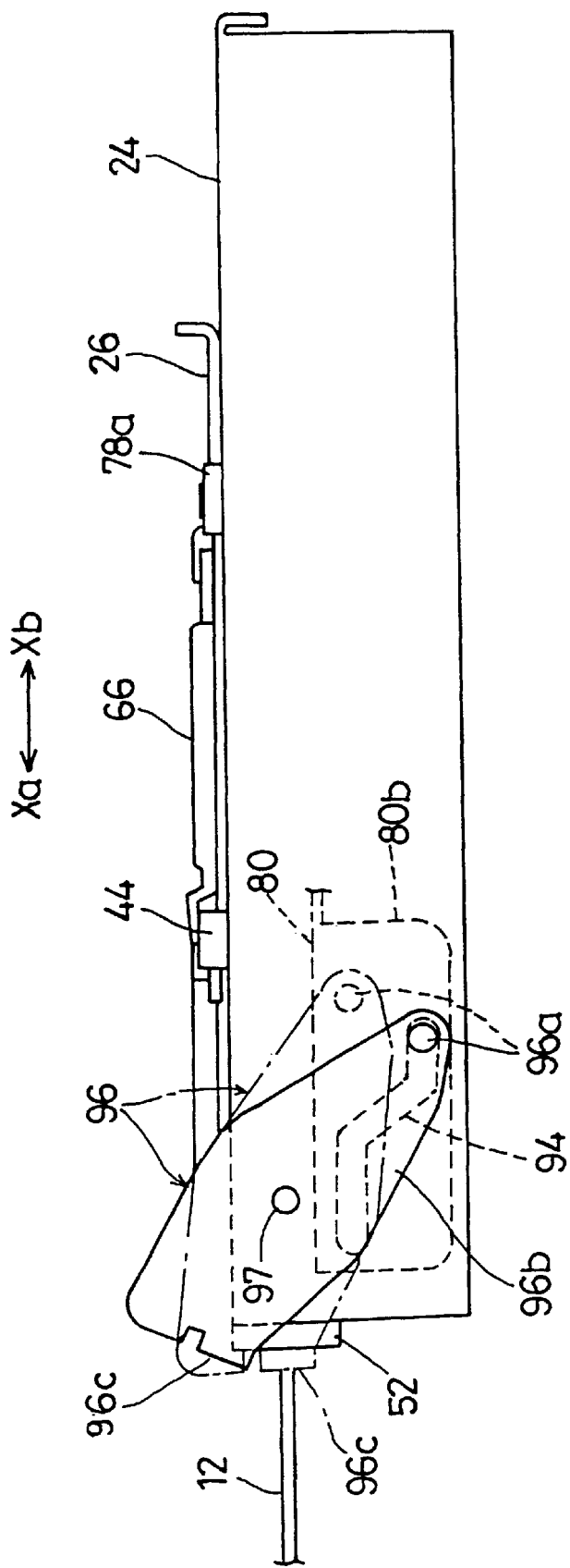
FIG. 6 is a lateral view of an opening and a closing of a shutter.

FIG. 6 is a lateral view of an opening and a closing of a shutter.

As shown in FIG. 6, a second side plate 80b of the sub-slider 80 is formed with a crank-shaped cam groove 94 (indicated by the dashed line in FIG. 5). The cam groove 94 engages a pin 96a of a shutter 96 that opens and closes the insertion slot 50 provided on the slit plate 52.

The shutter 96 comprises a pair of arm portions 96b rotatably supported by a shaft 97 provided opposite both lateral sides of the chassis 24 and a central bridge portion 96c that opposes a front edge of the insertion slot 50 and which lies between the pair of arm portions 96b. Additionally, arm portion 96b opposite the second side plate 80b of the sub-slider 80 is provided with the engaging pin 96a that engages the cam groove 94 described above.

As a result, the movement of the second side plate 80b having the cam groove 94 causes the shutter 96 to rotate between open and closed positions that open and close the insertion slot 50. Accordingly, when the disk 12 is inserted or ejected, the shutter 96 rotates upward and opens the insertion slot 50. When the disk 12 is loaded and clamped atop the turntable 64 the shutter 96 rotates downward (to a position indicated by a dashed line in FIG. 5) and closes the insertion slot 50.

A description will now be given of the composition of the first gear unit 76.

Figure 7A:
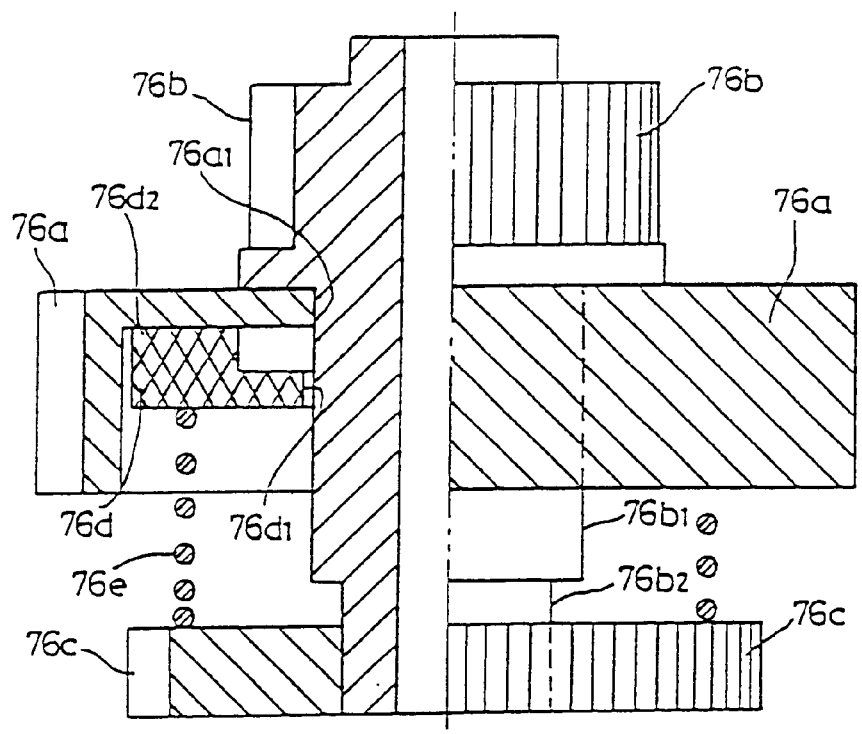
FIG. 7 shows s vertical cross-sectional view of a first gear unit together with a corresponding partially enlarged lateral view of a clutch mechanism inside the first gear unit.
Figure 7B:
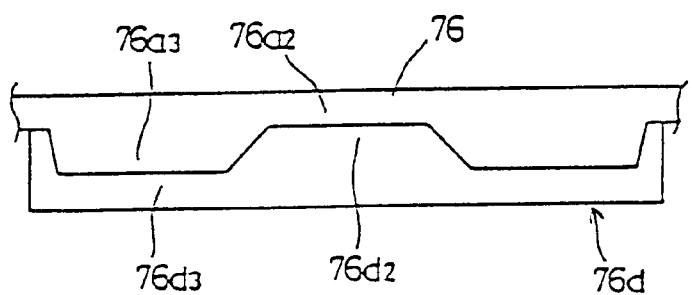

FIGS. 7A and 7B show a vertical cross-sectional view of a first gear unit 76 together with a corresponding partially enlarged lateral view of a clutch mechanism inside the first gear unit 76, respectively. Additionally, FIG. 8 is an exploded perspective view of the structure of the first gear unit 76.

Figure 8:
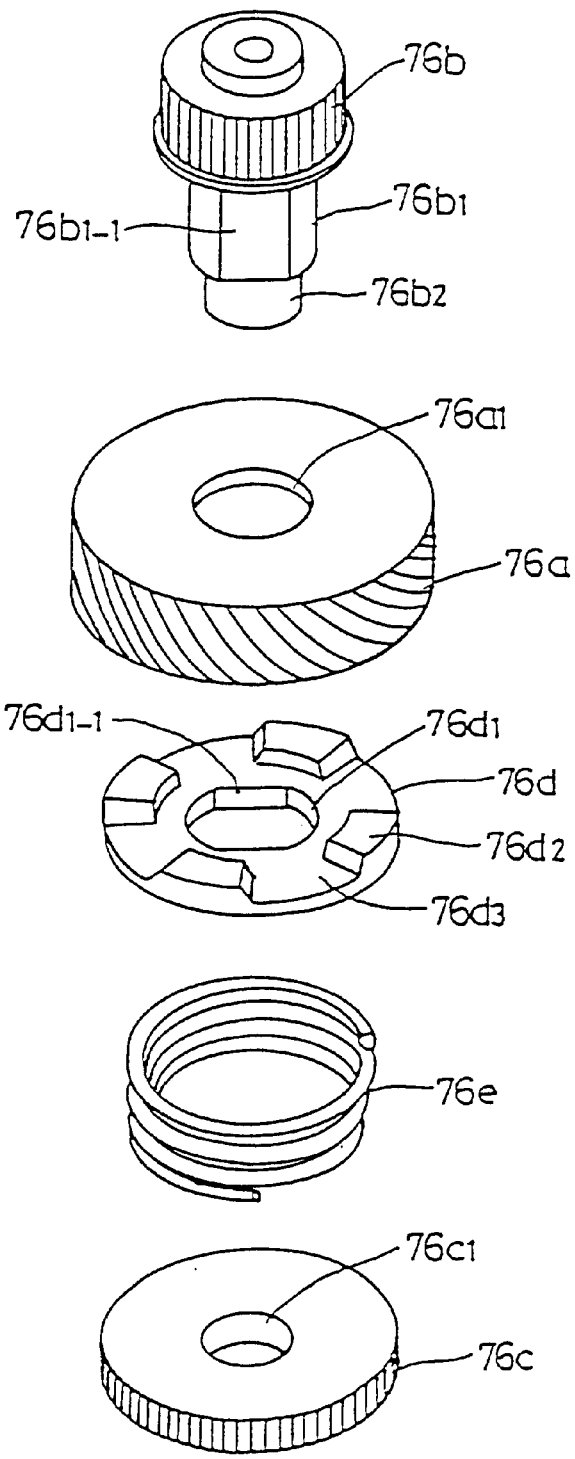
FIG. 8 is an exploded perspective view of the structure of the first gear unit.

As shown in FIG. 7A and FIG. 8, the first gear unit 76 comprises a worm gear 74, a worm wheel 76a that meshes with the worm gear 74, and small-diameter gear 76b, an emergency gear 76c, a clutch plate 76d the forms a clutch mechanism inside the worm wheel 76a, and a coil spring 76e (pressing member) that presses the clutch plate 76d against an inner wall of the worm wheel 76a. The small-diameter gear 76b has a first shaft 76b1 that penetrates a central hole 76a1 in the worm wheel 76a and a second shaft 76b2 that penetrates a central hole 76c1 in the emergency gear 76c.

The first shaft 76b1 has two engaging surfaces 76b1-1 formed of a portion of reduced thickness along an outer periphery of the shaft, the surfaces being parallel to each other. Similarly, a central hole 76d1 in the clutch plate 76d is likewise formed with engaging portions 76d1-1 to accommodate the portion of reduced thickness of the first shaft 76b1 that constitutes the engaging surfaces 76b1-1.

As shown in FIG. 7B, substantially trapezoidal convexities 76d2 as well as similarly trapezoidal concavities 76d3 are formed in an upper surface of the clutch plate 76d, the convexities 76d2 alternating with the concavities 76d3 around a periphery of the clutch plate 76d.

Likewise, trapezoidal concavities 76a2 for accommodating the clutch plate 76d convexities 76d2 are formed on the inner wall of the worm wheel 76a that is disposed opposite the upper surface of the clutch plate 76d. Similarly, trapezoidal convexities 76a3 that are accommodated by the clutch plate 76d concavities 76d3 are formed on the inner wall of the worm wheel 76a that is disposed opposite the upper surface of the clutch plate 76d, the convexities 76a3 alternating with the concavities 76a2 around a periphery of the clutch plate 76d.

Additionally, the clutch plate 76d is impelled upward by the spring force of the coil spring 76e, so the convexities 76d2 and the concavities 76d3 engage and mesh with the concavities 76a2 and convexities 76a3 formed in the inner wall of the worm wheel 76a. As a result, the rotational driving force of the worm 74 is transmitted to the second gear unit 78 large-diameter gear 78c via the worm wheel 76a, the clutch plate 76d that is meshed with the concavities 76a2 and convexities 76a3 of the worm wheel 76a, the first shaft 76b1 that engages the engaging portions 76d1-1 of the central hole 76d1 of the clutch plate 76d, and the small-diameter gear 76b that is integrated with the first shaft 76b1.

Additionally, the convexities 76*d*2, concavities 76*d*3, concavities 76*a*2 and convexities 76*a*3 are formed in substantially trapezoidal shape when viewed laterally, so an excessive load causes the slanted portions to slip and the clutch to slip as well. As will be described later, such an arrangement serves to break the path of transmission of the worm 74 and the work wheel 76*a* and thus lighten the load when operating a manual eject.

A description will now be given of an ejection of a disk 12 from the disk loading device 10 having the structure described above.

Figure 9B:
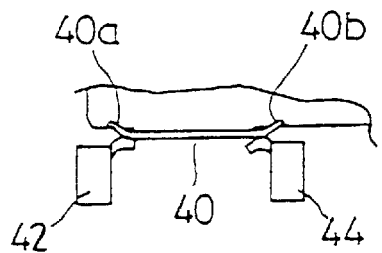

FIGS. 9A and 9B show a plan view of a disk eject state and a positional relation of the main slider and the detection switch, respectively.

As shown in FIG. 9A, when ejecting the disk 12 which is clamped between the turntable 64 and the damper 68, pressing an eject button not shown in the diagram causes the drive mechanism 70 second gear unit 78 to be rotatably driven in the counter-clockwise direction by the motor 72, so that the main slider 26 and the sub-slider 80 are slid in the Xa direction.

When the sub-slider 80 is slid in the Xa direction, the sub-chassis 60 pins 60*a*, 60*b* that engage the sub-slider 80 cam grooves 82, 84 move downward together with the movement of the cam grooves 82, 84. As a result, the turntable 64, which is supported by the sub-chassis 60, is lowered from a disk clamp position to a clamp release position.

Additionally, when the main slider 26 slides in the Xa direction, the movement of the angular cam 48 moves the damper 68 supported by the damper holder 66 from a disk clamp position to a clamp release position above the disk clamp position.

After the lowering of the turntable 64 and the rise of the damper 68, the main slider 26 slides further in the Xa direction and the first and second arms 16, 18 (18A, 18B) rotate in the counter-clockwise direction. At this time, the first arm 16 moves the disk 12 from the loading position toward the Xa direction. The third arm 20 is pressed by the disk 12 and rotates in the clockwise direction. The second loading arm 18 rotates in the clockwise direction together with the guide arm 18A and the roller 32 is driven by the first arm 16 in the Xa direction by the disk 12, which causes the retention arm 18B to rotate counter-clockwise with respect to the guide arm 18A.

Accordingly, the roller 32 provided at the tip of the retention arm 18B is impelled by the force of the coil spring 19 so as to contact and press against the periphery of the disk 12. At this time, a pressing portion 18B*a* of the retention arm 18B contacts the fourth detection switch 45, which causes the detection switch 45 to turn ON (see FIGS. 9A and 9B).

As a result, the disk 12 is supported from three directions by the rollers 29, 32 and 35 provided on the tip portions of the arms 16, 18, 20, and further, the disk 12 is moved in the eject direction (the Xa direction) by the pressure of the roller 29 while being supported by the disk guides 22, 23.

As shown in FIG. 9B, when the disk 12 is ejected to a position halfway out of the insertion slot 50, the slanted portions 40*a*, 40*b* at both ends of the cam plate 40 press against the second and third detection switches 42, 44 and turn both the second and third detection switches 42, 44 ON. When both the second and third detection switches 42, 44 turn ON, the motor 72 temporarily stops rotating.

Figure 10A:
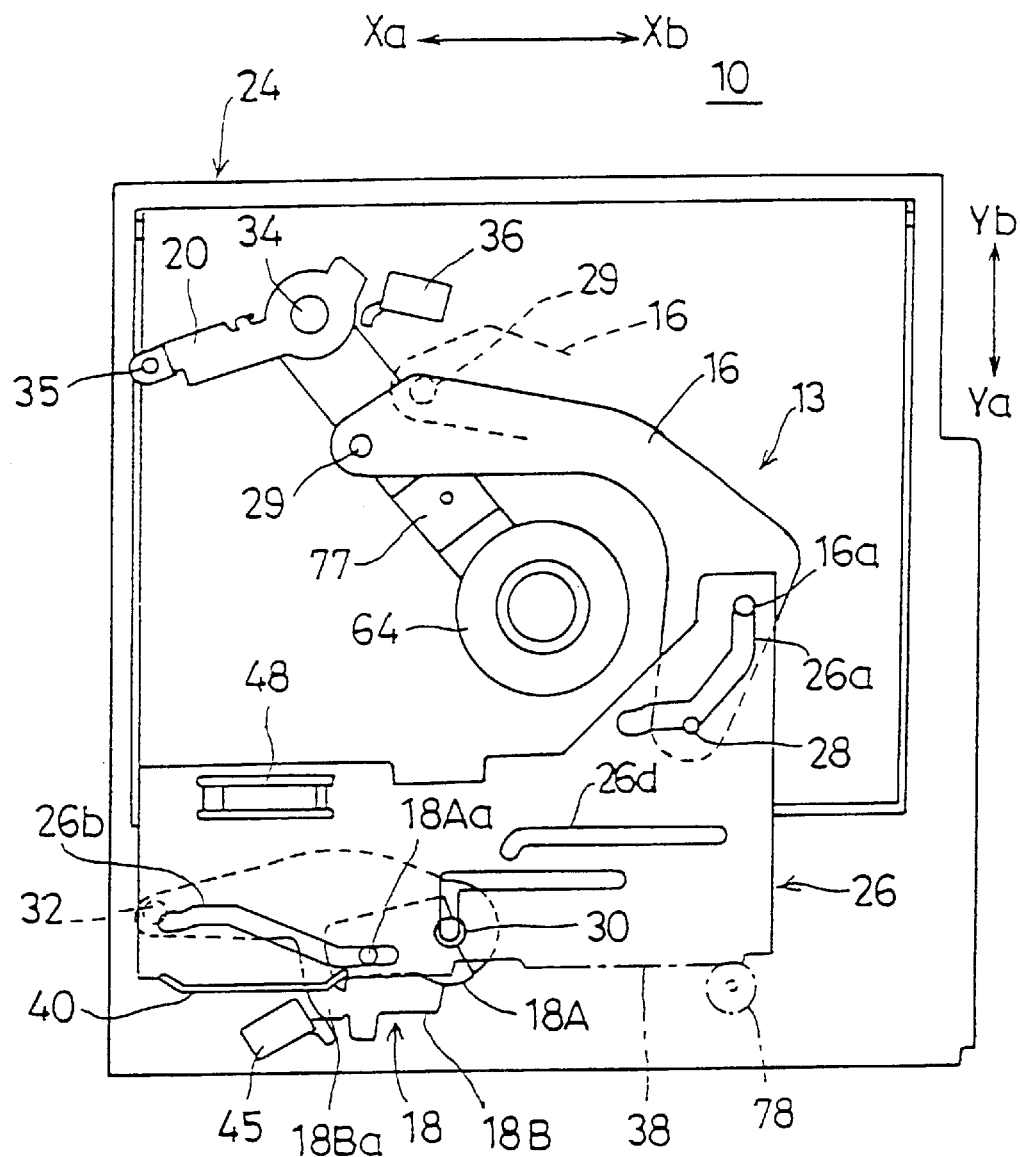
FIGS. 10A and 10B show a plan view of a disk insert standby state and a positional relation of the main slider and the detection switch, respectively.
Figure 10B:
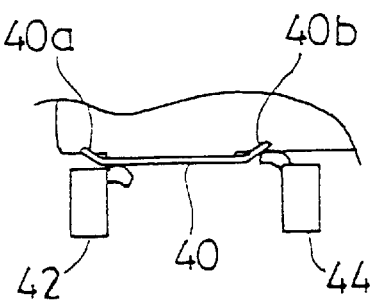

FIGS. 10A and 10B show a plan view of a disk insert standby state and a positional relation of the main slider and the detection switch, respectively.

As shown in FIG. 10A, once the disk 12 is removed the disk loading device 10 is put into a standby state, awaiting the insertion of the disk.

Additionally, once an operator removes the disk 12 from the insertion slot 50, the second loading arm 18 is impelled by the force of the coil spring 19 so that the retention arm 18B rotates in the clockwise direction with respect to the guide arm 18A. At this time, a pressing portion 18B*a* of the retention arm 18B separates from the fourth detection switch 45, which causes the detection switch 45 to turn OFF.

When the motor 72 starts rotating again it slides the main slider 26 in the Xa direction. As a result, the arm 16 rotates in the counter-clockwise direction, the roller 29 is brought near a rear side of the insertion slot 50 and the unit is readied for insertion. At this time, the roller 29 is positioned virtually opposite the insertion slot 50.

As such, after the disk 12 has been ejected and then withdrawn manually from the unit, the roller 29 is positioned opposite the rear side of the insertion slot 50, so the next time the disk 12 is inserted the leading edge of the disk 12 is promptly engaged by the roller 29. As a result, the disk 12 is prevented from being inserted at a position not aligned with the roller 29, so that even if the insertion of the disk 12 into the insertion slot 50 is not level but is slightly slanted up or down, the disk 12 can nevertheless be securely engaged by the roller 29.

As shown in FIG. 10B, when the arm 16 is rotated to the standby position awaiting the insertion of the disk 12, the slanted portion 40*a* on the left side of the cam plate 40 presses the second detection switch 42 and, at the same time, the slanted portion 30*b* on the right side of the cam plate 40 separates from the third detection switch 44. As a result, the third detection switch 44 turns OFF and the second detection switch 42 turns ON, thus halting the rotation of the motor 72.

Additionally, when the disk 12 is inserted and loaded, each of the arms 16, 18 (18A, 18B) and 20 performs operations exactly the reverse of the above-described eject operation, thus clamping the disk 12 in place via the turntable 64 and the damper 68.

As described above, with the disk loading device 10 the loading and the ejection of the disk 12 is accomplished by rotation of the individual arms 16, 18 (18A, 18B) and 20.

A description will now be given of a method for ejecting the disk 12 manually when the drive mechanism 70 motor 72 cannot be driven.

Figure 11:
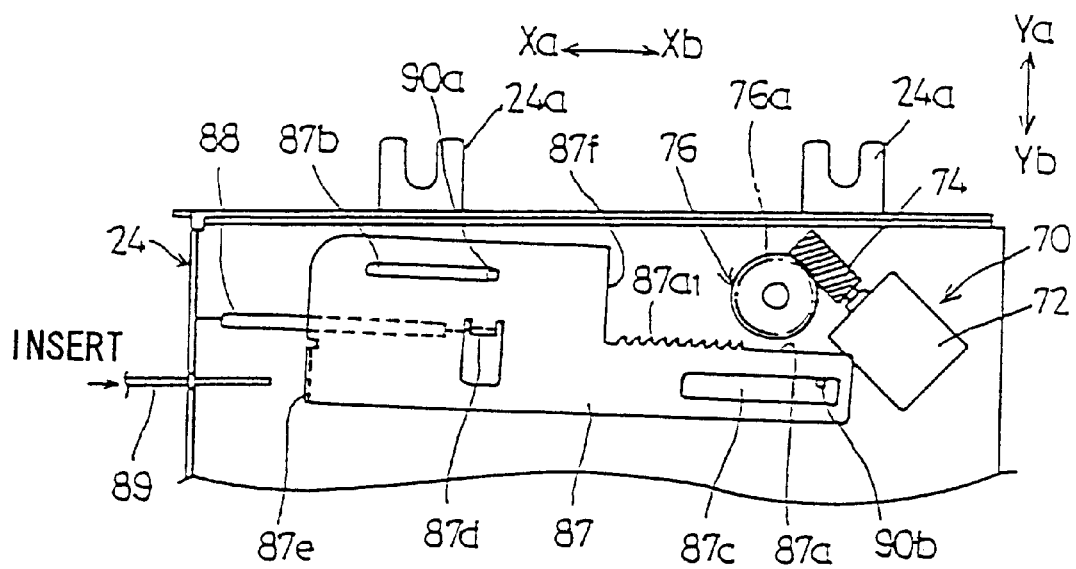
FIG. 11 is a bottom view of an initial stage of a manual eject operation.

FIG. 11 is a bottom view of an initial stage of a manual eject operation. FIG. 12 is a bottom view of a state of the drive mechanism prior to ejection of a disk.

As shown in FIG. 11, prior to ejection the drive mechanism 70, the eject slider 87 is moved in the Xa direction, so that the rack 87*a*1 is separated from the first gear unit 76 emergency gear 76*c*.

If, for example, power is lost while the disk 12 is clamped in place inside the unit and it is no longer possible to automatically eject the disk 12, then the disk 12 may be ejected manually. In such a case, the operator inserts a long thin shaft called an emergency pin 89 into the emergency hole 58 provided on the front surface of the unit.

The emergency pin 89 is inserted into the emergency hole 58 from the Xb direction, so that a tip of the emergency pin 89 contacts a press portion 87*e* provided at the Ya side of the eject slider 87 (see FIG. 5). Further, when the emergency pin 89 is pressed in the Xb direction, the eject slider 87 moves in the Xb direction against the spring force of the coil spring 88.

Figure 12:
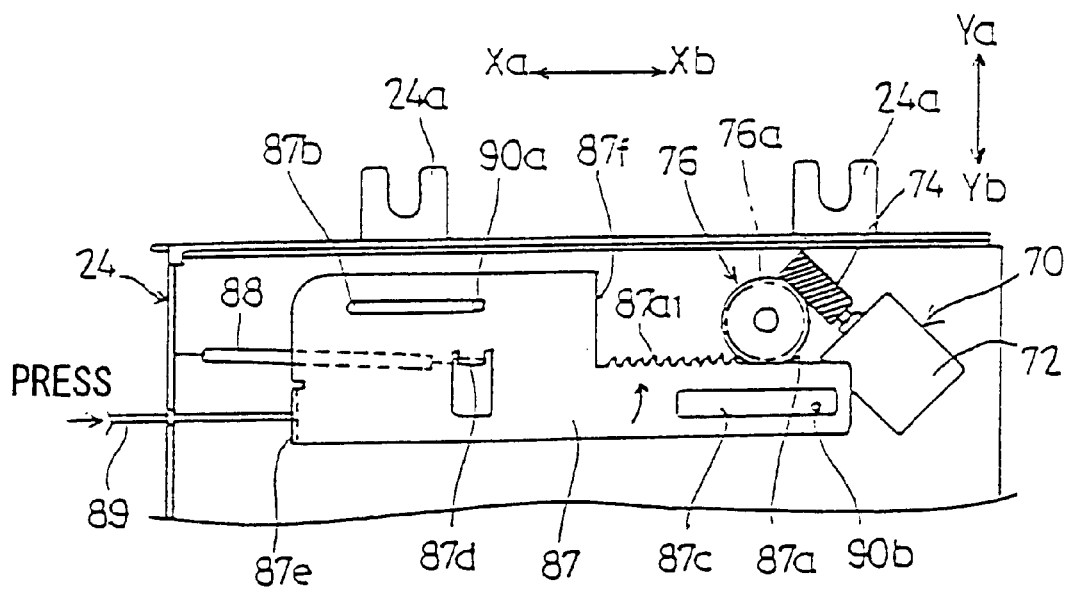
FIG. 12 is a bottom view of a state of the drive mechanism prior to ejection of a disk.

At this time, the eject slider 87, as shown in FIG. 12, one boss 90a firmly engages one guide groove 87b and the other boss 90b firmly engages the other guide groove 87c, so that when the emergency pin 89 presses against the press portion 87e, which is provided at a point shifted toward the Ya direction with respect to the boss 90a, the eject slider 87 rotates counter-clockwise with respect to the boss 90a.

When the eject slider 87 rotates in the counterclockwise direction (the Ya direction in FIG. 12), a side portion of the extension 87a that extends in the Xb direction from a left lateral side of the eject slider 87 contacts the emergency gear 76c of the first gear unit 76 and, sliding in the Xb direction, causes the rack 87a1 on the extension 87a to contact the emergency gear 76c.

Figure 13:
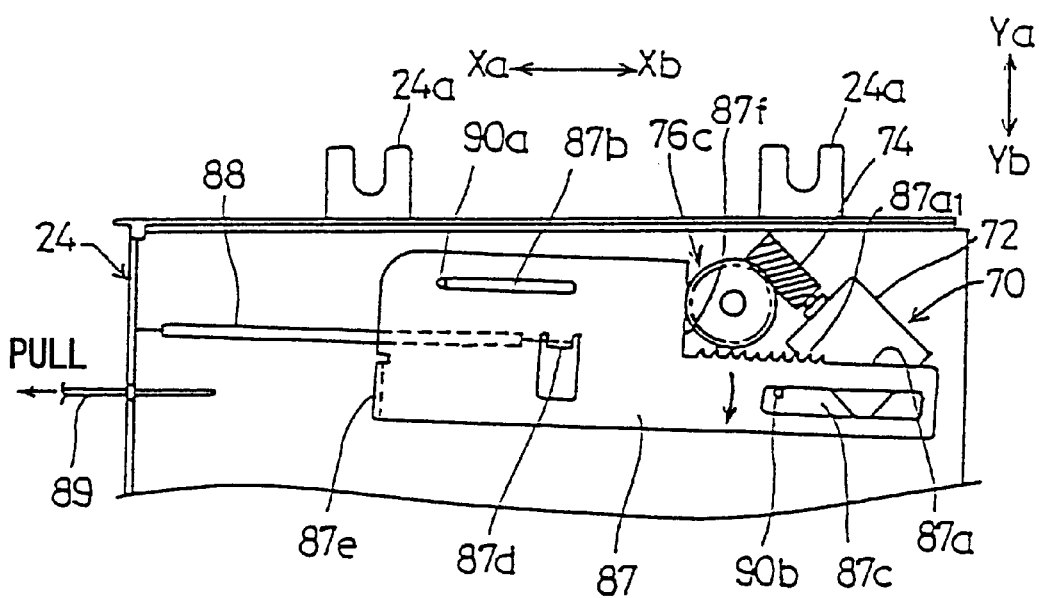
FIG. 13 is a bottom view of a state in which a rack of the eject slider rotatably drives an emergency gear.

FIG. 13 is a bottom view of a state in which the rack 87a1 of the eject slider 87 rotatably drives the emergency gear 76c.

As shown in FIG. 13, when the press portion 87e of the eject slider 87 is pushed by the emergency pin 89, the emergency gear 76c is rotated in the counter-clockwise direction and the groove 87b of the eject slider 87 slides to a stop position contacting the boss 90a of the bottom chassis 90.

Figure 14:
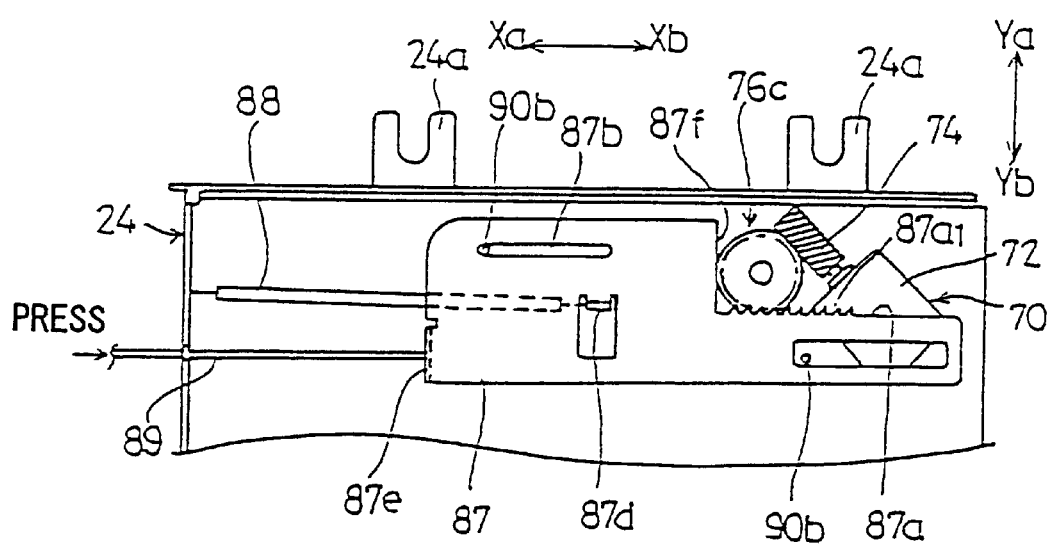
FIG. 14 is a bottom view of a state in which an emergency pin is retracted in an Xa direction.

FIG. 14 is a bottom view of a state in which the emergency pin 89 is retracted in the Xa direction.

As shown in FIG. 14, after a step portion 87f of the eject slider 87 contacts the emergency gear 76c, the emergency pin 89 is withdrawn in the Xa direction and the eject slider 87 is impelled by the spring force of the coil spring 88 to rotate in a clockwise direction (shown as Yb in FIG. 13), so that the rack 87a1 separates from the emergency gear 76c of the first gear unit 76.

Then, the eject slider 87 is impelled by the spring force of the coil spring 88 to move in the Xa direction so as to return to a position prior to manual eject (see FIG. 11).

Next, by again pressing the press portion 87e of the eject slider 87 in the Xb direction, the eject operation described above is repeated and the main slider 26 can be moved in the Xa eject direction.

Figure 15:
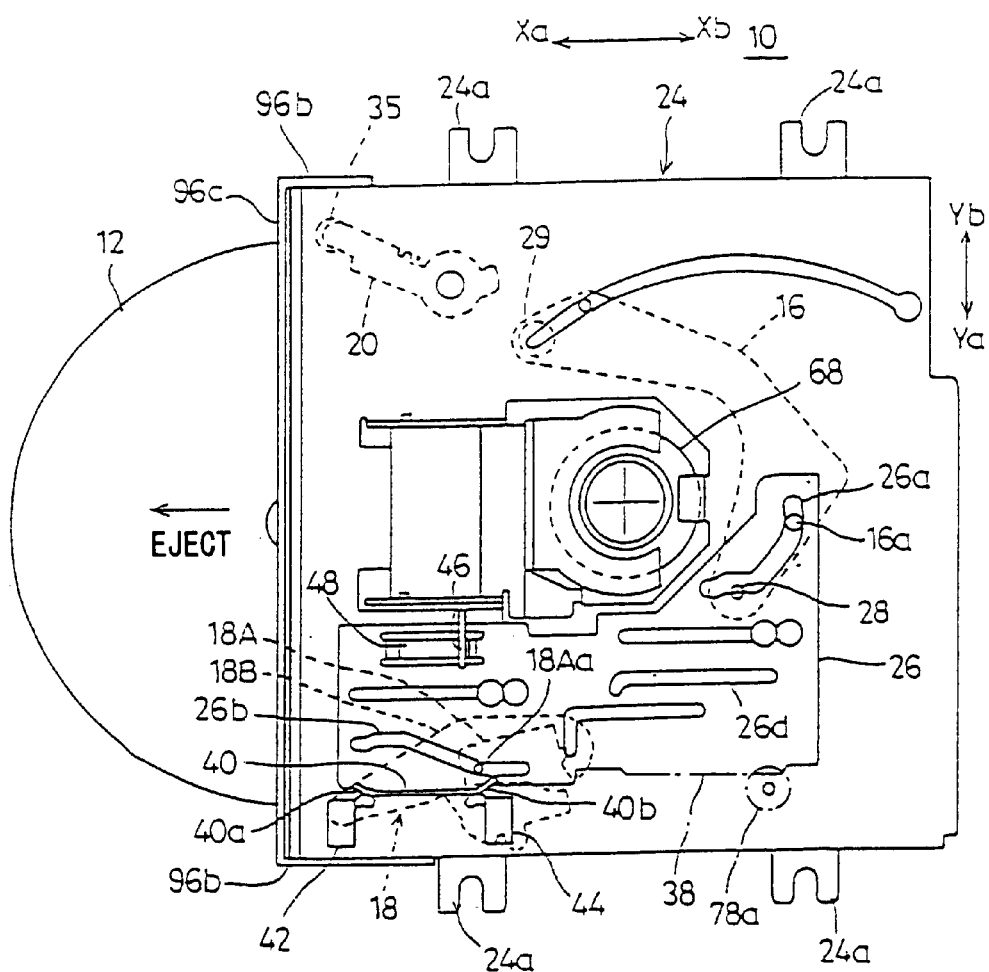
FIG. 15 is a plan view of a disk eject state.

FIG. 15 is a plan view of a disk eject state.

As shown in FIG. 15, when the emergency pin 89 is inserted from the emergency hole 58 and the eject slider 87 press portion 87e is pressed multiple times in the Xb direction, the second gear unit 78 is rotatably driven in the counter-clockwise direction via the first gear unit 76, and the main slider 26 and the sub-slider 80 are driven in the eject direction (Xa).

As a result, when as described above the main slider 26 and the sub-slider 80 slide in the Xa direction, the pins 60a, 60b of the sub chassis 60 that engage the sub-slider 80 cam grooves 82, 84 move downward with the movement of the cam grooves 82, 84 (refer to FIG. 3). Accordingly, the turntable 64 that is supported by the sub chassis 60 descends from a disk clamp position to a clamp release position (see FIG. 2).

Additionally, the pin 96a of the shutter 96 that engages the cam groove 94 of the sub-slider 80 moves downward with the movement of the cam groove 94. In so doing, the shutter 96 moves from the closed position to the open position (shown as a solid line in FIG. 6).

As the main slider 26 slides in the Xa direction, the movement of the angular cam 48 causes the damper 68 (which is supported by the damper holder 66) to move from the disk clamp position to the clamp release position above the disk clamp position.

Further, when the main slider 26 slides in the Xa direction, the first and second arms 16 and 18 rotate in the counter-clockwise direction and the disk 12 is moved from the loaded position to the eject direction (Xa).

As a result, the disk 12, which remains supported by the rollers 29, 32 and 35 provided on the tip portions of the arms 16, 18 and 20, moves to the position shown in FIG. 15. Thus, simply by carrying out the simple manual operation of pushing the press portion 87e of the eject slider 87 multiple times in the Xb direction using the emergency pin 89, the disk 12 loaded in the interior of the unit can be retrieved relatively simply.

Accordingly, the operator does not need to bother with manually rotating a jig so as to rotate a gear as is conventionally the case, and further, can eject the disk 12 from the unit relatively quickly.

Figure 16:
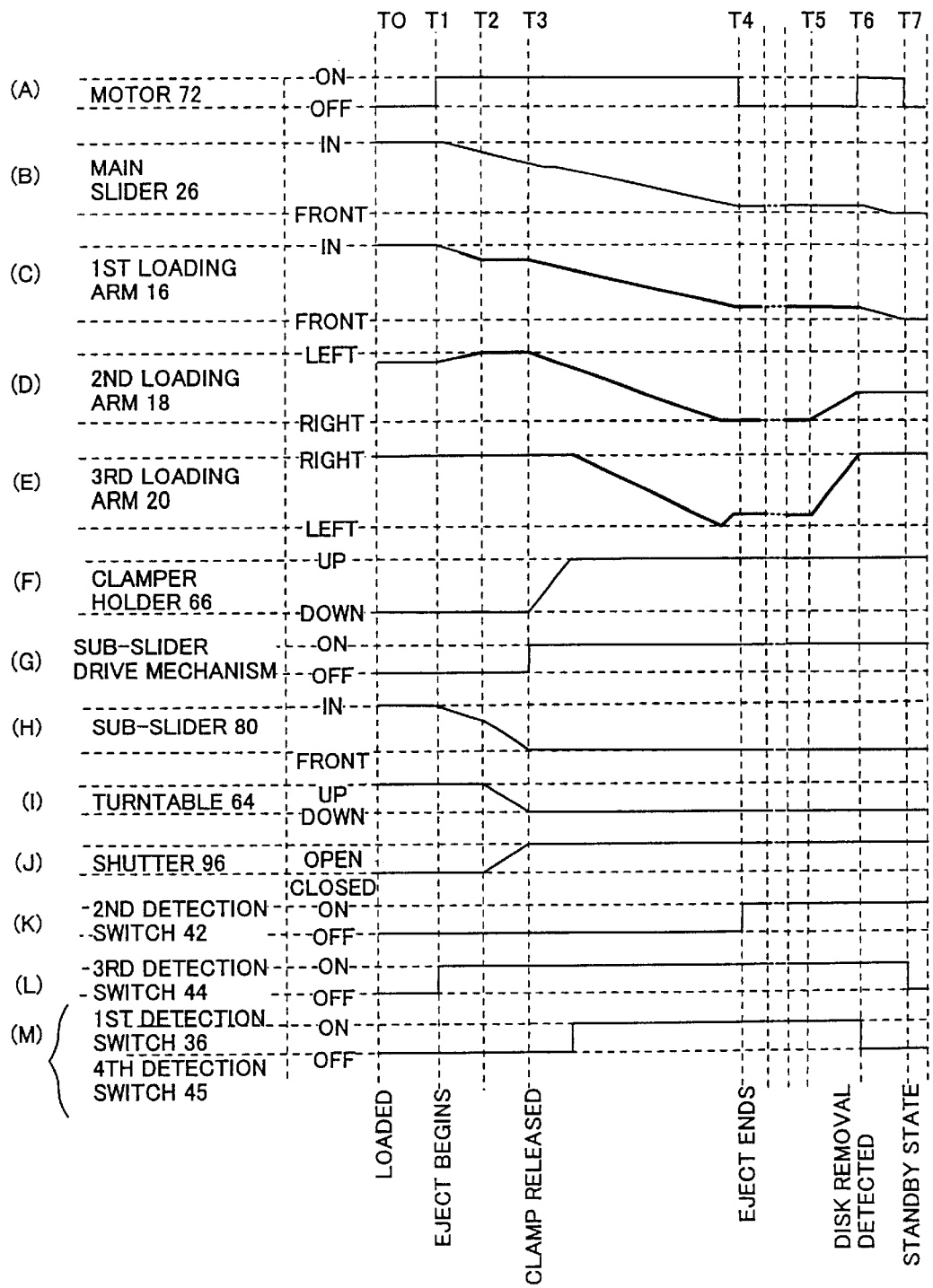
FIG. 16 is a timing chart showing the operational timing of various constituent parts of the disk unit according to the present invention, including the motor, main slider, arms, clamper holder, sub-slider drive mechanism (not otherwise indicated in the drawings), sub-slider, turntable, shutter, detection switches.

FIG. 16 is a timing chart showing the operational timing of various constituent parts of the disk unit according to the present invention, including the motor 74, main slider 26, arms 16, 18 and 20, damper holder 66, sub-slider drive mechanism (not indicated in the drawings), sub-slider 80, turntable 64, shutter 96, detection switches 42, 44, 36 and 45.

It should be noted that with respect to (C) in FIG. 16, the thin line indicates that the roller 29 of the arm 16 is separated from the outer periphery of the disk 12 and the thick line indicates that the roller 29 of the arm 16 is contacting the outer periphery of the disk 12.

Also, it should be noted that with respect to (D) in FIG. 16, the thin line shows that the roller 30 of the arm 18 is separated from the outer periphery of the disk 12 and the thick line indicates that the roller 30 of the arm 18 is contacting the outer periphery of the disk 12. Additionally, the left position shows a state in which the roller 30 is at the left side (Yb side) when seen from the front and the right position shows a state in which the roller 30 is positioned at a right side (Ya side) when seen from the front.

With respect to (E) in FIG. 16, the thin line portion indicates that the roller 32 of the arm 20 is separated from the outer periphery of the disk 12, and that the thick line portion indicates that the roller 32 of the arm 20 is contacting the outer periphery of the disk 12. Additionally, the left position shows a state in which the roller 32 is positioned at a left side (Yb side) when seen from the front and the right position shows a state in which the roller 32 is positioned at a right side (Ya side) when seen from the front.

A description will now be given of each time T1 through T7 with reference to (A) through (M) of FIG. 16, as well as to FIGS. 17A, 17B and 17C. FIGS. 17A, 17B and 17C are diagrams of a structure and operation of a second loading arm 18, showing plan views of disassembled guide arm 18A and retention arm 18B, a disk loaded state, and an eject state, respectively.

(1) At time 0, a disk load condition is shown (see FIGS. 1A, 1B). At this time, the disk 12 is clamped by the turntable 64 and the clamper 68 supported by the clamper holder 66. Additionally, the rollers 29, 30 and 32 supported by the arms 16, 18 and 20 are separated from the outer periphery of the disk 12.

(2) At time Ti, the motor 72 is driven in response to a pressing of the eject button (not shown in the diagram) and the eject operation begins. At this time, the third switch 44 turns ON.

(3) In the interval from time T1 to time T2, the main slider 26 is driven by the motor 72 toward the front (Xa direction) from the position shown in FIG. 1A. At this time, the pin 16a of the arm 16 is engaging the cam groove 26a of the main slider 26, so the arm 16 rotates toward the front (Xa direction) and the roller 29 contacts the periphery of the disk 12. Additionally, pin 18a of the arm 18 is engaging the cam groove 26b of the main slider 26, so the arm 18 rotates in the Yb direction and the roller 30 contacts the periphery of the disk 12.

The drive force of the motor 72 moves the sub-slider 80 forward in the Xa direction. The turntable 64 is held in the disk clamp position because the sub-chassis 60 pins 60a, 60b are engaged at an upper position of the sub-slider 80 cam groove 82, 84. The pin 96a of the shutter 96 is engaged at an upper position of the cam groove 94, so the insertion slot 50 of the slit plate 52 is at the closed position (indicated by the dashed line in FIG. 6).

In other words, in the interval T1 to T2, the rollers 29 and 30 contact the periphery of the disk 12 in a state in which the disk 12 is clamped.

(4) In the interval from time T2 to time T3, the main slider 26 is driven further forward in the Xa direction by the drive force of the motor 72. At this time the pins 16a and 18a engage a straight-line portion extending in the Xa–Xb direction within the cam grooves 26a, 26b, and so the arms 16 and 18 do not move from the T2 position.

The sub-slider 80 is driven further forward in the Xa direction by the drive force of the motor 72. The turntable 64 descends to a disk clamp release position as the sub-chassis 60 pins 60a and 60b are engaged at a lower position of the sub-slider 80 cam groove 82, 84 (see FIGS. 2, 3). The pin 96a of the shutter 96 is engaged at a lower position of the cam groove 94, so the insertion slot 50 of the slit plate 52 moves to an open position (indicated by the solid line in FIG. 6).

(5) In the interval from time T3 to time T4, the main slider 26 is driven by the motor 72 (see FIGS. 9A, 9B).

In the first half of the movement from the time T3 to the time T4, the sub-slider drive mechanism (not shown in the drawing) connected to the main slider 26 and the sub-slider 80 separates from the gear unit 78. In other words, the drive force of the motor 72 is transmitted to the main slider 26, and the main slider 26 retracts the sub-slider 80 via the sub-slider drive mechanism.

Additionally, in the first half of the movement from the time T3 to the time T4, the angular cam 48 of the main slider 26 drives the pin 46 of the damper holder 66, so that the damper holder 66 moves to an upper position, that is, a clamp release position. In so doing, the damper 68 supported by the damper holder 66 is withdrawn above the disk 12.

At the same time, the arms 16, 18 and 20 rotate. The pin 16a of the arm 16 is driven by the cam groove 26a of the main slider 26 and the arm 16 moves forward while pushing the disk in an eject direction (Xa direction).

The pin 18Aa of the guide arm 18A is driven by the main slider 26 cam groove 26b, the arm 18 rotates in the counter-clockwise direction and the retention arm 18B second roller 32 is driven by the ejection of the disk 12 so that the retention arm 18B rotates in the counter-clockwise direction relative to the guide arm 18A (see FIG. 17C). In so doing, the arm 18 moves to a right position while supporting the disk 12 and, at that time, the retention arm 18B press portion 18Ba presses the fourth detection switch 45 and turns the fourth detection switch 45 ON.

Then, the roller 35 provided at the tip of the arm 20 is driven by the ejection of the disk 12 so as to rotate while supporting the periphery of the disk 12. Further, when the arm 20 rotates in response to the ejection of the disk 12, the tip of the arm 20 presses the first detection switch 36 and the first detection switch 36 turns ON.

That is, the disk 12 is ejected while being supported by the rollers 29, 30 and 35 of the arms 16, 18 and 20 as well as the disk guides 22, 23, and is pressed in the eject direction by the roller 29 and ejected.

(6) At time T4, the second detection switch 42 is pressed by the slanted portion 40a of the left edge of the cam plate 40 and turns ON (see FIGS. 10A, 10B). Then, when the second detection switch 42 turns ON, the eject operation completion is detected and the rotation of the motor 72 is halted.

Thereafter, the unit is in standby until the user manually extracts the disk 12 therefrom and monitors the states of the first detection switch 36 and the fourth detection switch 45.

(7) In the interval from time T5 to time T6, when the user extracts the disk 12, the arm 20 is urged in the counter-clockwise direction by the force of a spring not shown in the diagram and rotates to a right-side position (Ya direction). Additionally, the force of the coil spring 19 rotates the retention arm 18B clockwise with respect to the guide arm 18A (see FIG. 17C), causing the arm 18 to rotate to a left-side position (Yb direction) (see FIG. 10A).

(8) At time T6, the arm 20 moves to the right-side position and the arm 18 moves to the left. The tip of the arm 20 separates from the first detection switch 36 and the arm 18 separates from the fourth detection switch 45. In so doing, the first detection switch 36 turns OFF and the fourth detection switch 45 turns OFF, and the extraction of the disk 12 is detected.

(9) In the interval from time T6 to time T7, the main slider 26 is driven further forward in the Xa direction by the drive force of the motor 72. The arm 16 moves forward in the Xa direction because the pin 16a is driven by the main slider 26 cam groove 26a.

(10) At time T7, the main slider 26 cam plate 40 separates from the third detection switch 44 and the third detection switch 44 turns OFF. When the third detection switch 44 is turned OFF the completion of the movement of the unit to the standby state awaiting the insertion of the disk is detected and the rotation of the motor 72 is stopped.

It should be noted that, thereafter, when no disk 12 is inserted, pressing the eject button (not shown in the diagram) rotates the motor 72 in reverse and turns the third detection switch 44 from OFF to ON, and further rotating the motor 72 in reverse closes the shutter 96 (indicated by the dashed line in FIG. 6).

When the third detection switch 44 is switched from ON to OFF, the rotation of the motor 72 is stopped. At this time, the arms 16 and 18 move in the Xb direction and return from the disk insertion standby state to an initial state (a loading state, as shown for example in FIGS. 1A and 1B).

Additionally, the disk loading device of the present embodiment is limited to a disk having a diameter of 12 cm and cannot use a disk having a diameter of 8 cm, and accordingly is configured so that loading is not carried out whenever a disk having a diameter of 8 cm is inserted into the unit, a description of this configuration being given below.

Specifically, the third loading arm 20 that turns a first detection switch 36 ON and OFF and the second loading arm 18 that turns the fourth detection switch 45 ON and OFF are not rotatably driven at the same time whenever an 8-cm disk is inserted. Then, when an insertion of a disk is detected by the disk insertion detection mechanism not shown in the diagram, the first detection switch 36 and the fourth detection switch 45 are checked and loading is not carried out if one of or both the first detection switch 36 and the fourth detection switch 45 is OFF. If both the first and fourth detection switches 36 and 45 are turned ON then loading is performed, because it is determined that the disk inserted is a 12-cm diameter disk.

In other words, the motor 72 is rotated in reverse and the third switch 44 is switched from OFF to ON, and when the motor 72 is further rotated in reverse the arms 16 and 18 move in the Xb direction and the disk 12 is loaded (see FIGS. 1A and 1B), the third detection switch 44 is turned OFF and the rotation of the motor 72 is stopped.

Figure 17:
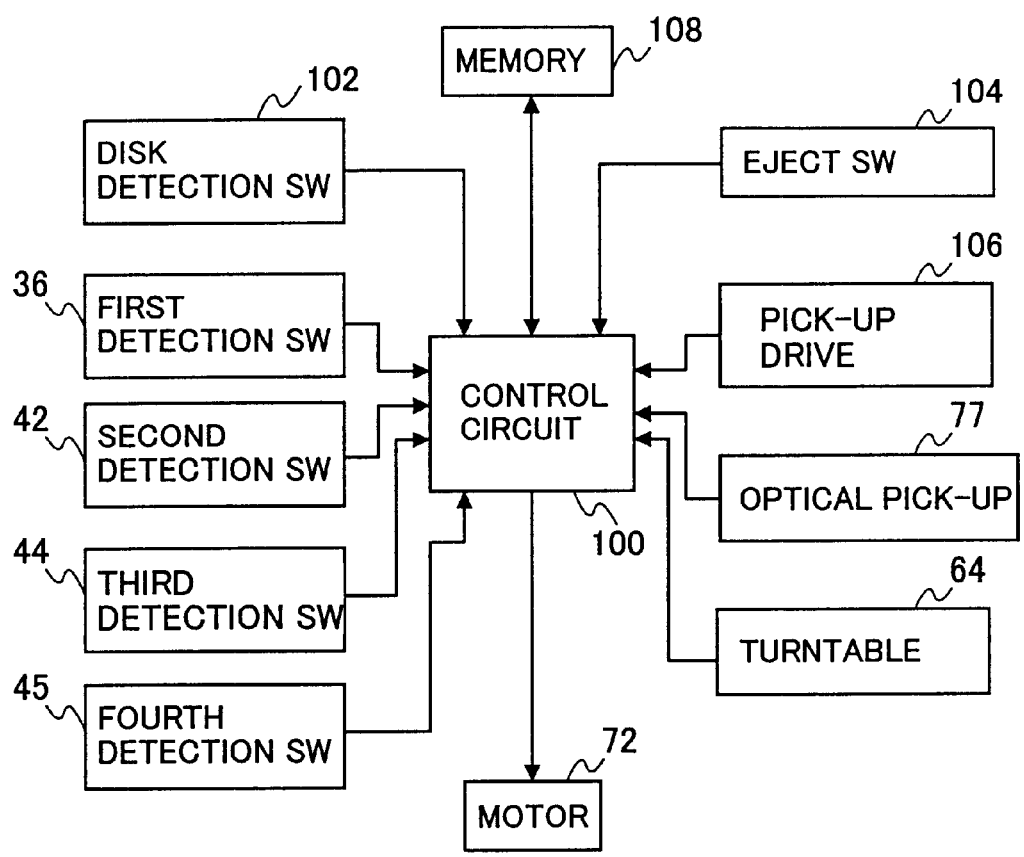
FIG. 17 is a block diagram of a control system according to the present invention.

FIG. 17 is a block diagram of a control system according to the present invention.

As shown in FIG. 17, first through fourth detection switches 36, 42, 44 and 45, the turntable 64, the motor 72, the optical pick-up 77, a disk detection switch 102 that detects the insertion of the disk 12, an eject switch 104 operated during ejection, a pick-up drive portion 106 that drives the optical pick-up 77, and the memory 108 are connected to a control circuit 100 that controls the operation of the disk loading device 10.

The memory 108 stores both a control program I that controls the loading of the disk 12 as well as a control program II that controls the drive of the motor 72 so as to further drive the arm 16 in the eject direction so as to bring the roller 29 adjacent to the insertion slot 50 as the disk is removed from the insertion slot 50 after the disk 12 has moved to the eject position. Accordingly, the control circuit 100 performs a loading operation and an eject operation based on the control program stored in the memory 108.

Figure 18:
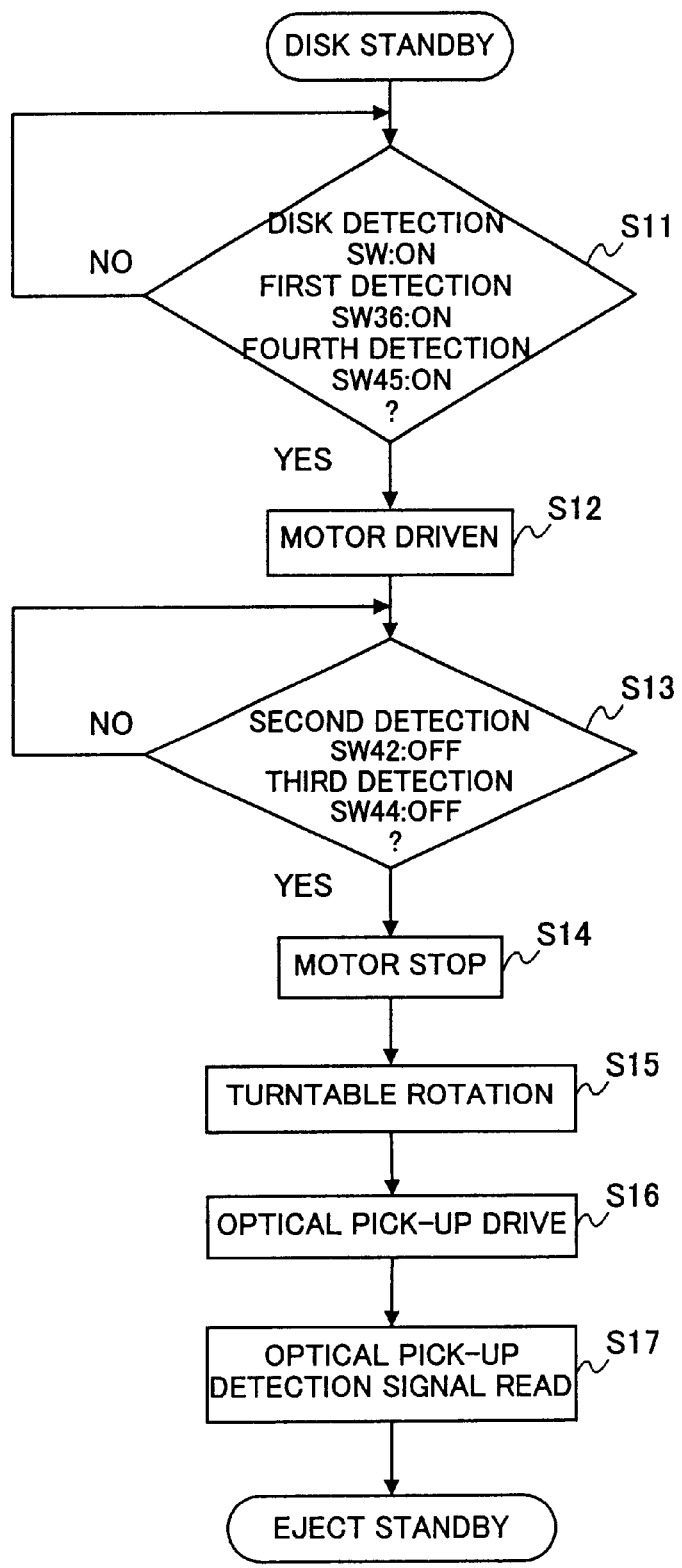
FIG. 18 is a flow chart showing the disk loading process performed by the control circuit.

FIG. 18 is a flow chart showing the disk loading process performed by the control circuit 100.

As shown in FIG. 18, when a 12-cm disk 12 is inserted into the insertion slot 50 and the disk detection switch 102 and first and fourth detection switches 36 and 45 turn ON, in a step S11 the control circuit 100 outputs a detection signal. When in the step S11 the disk detection switch 102 and first and fourth detection switches 36 and 45 turn ON, the process proceeds to a step S12.

In the step S12, the motor 72 is rotatably driven and the main slider 26 is slid in the Xb direction, causing the arms 16, 18 to rotate in a disk loading direction (the clockwise direction as shown in FIGS. 9A, 9B, 10A and 10B).

Next, in a step S13, the second and third detection switches 42, 44 are checked to determine whether or not they are turned OFF. When the main slider 26 moves to the loading position as shown in FIGS. 1A and 1B, the second and third detection switches 42 and 44 both turn OFF, so the process proceeds to a step S14 and the motor 72 stops.

At this point, the disk 12 is clamped by the turntable 64 and the damper 68, completing loading. In a step S15, the turntable 64 is rotatably driven.

Next, in a step S16, the pick-up 77 is driven by the pick-up drive portion 106. In a step S17, the optical pick-up 77 reads the detected detection signal.

Figure 19:
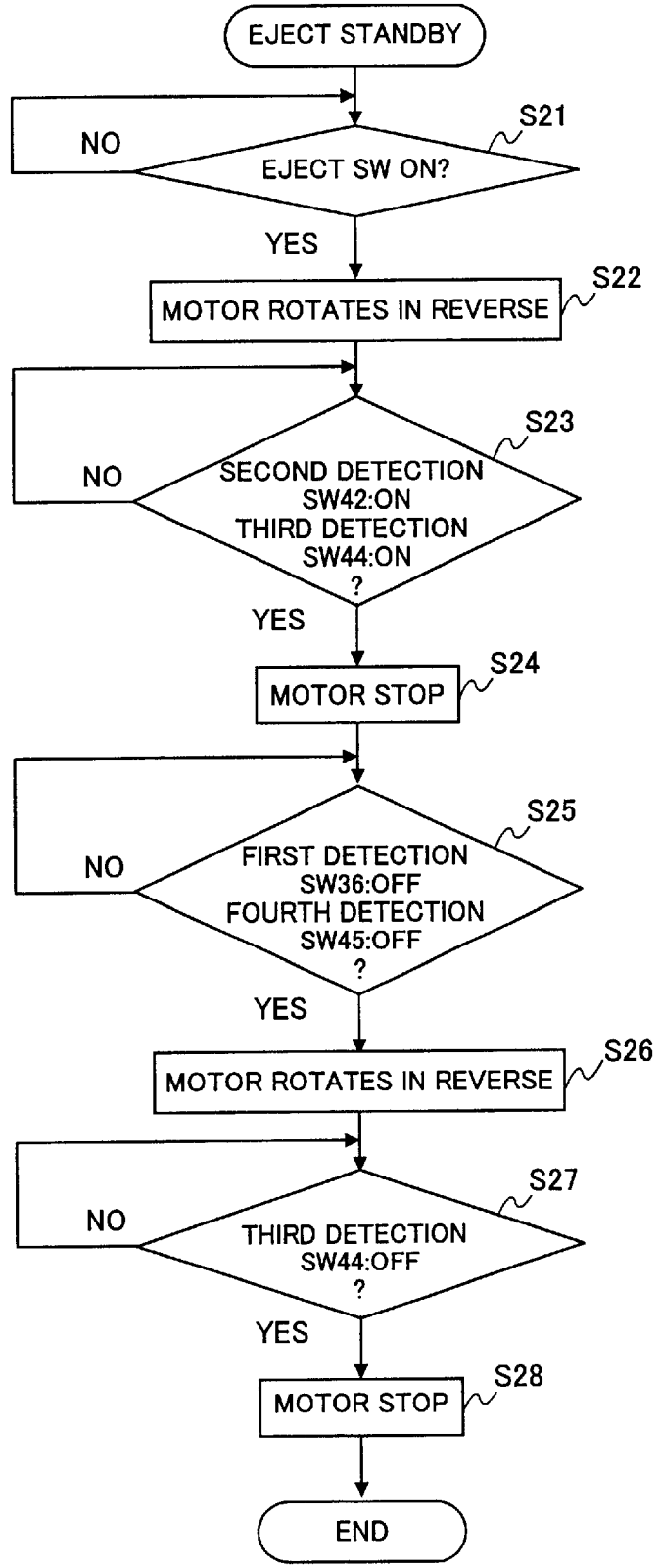
FIG. 19 is a flow chart showing the disk eject process performed by the control circuit.

FIG. 19 is a flow chart showing the disk eject process performed by the control circuit 100.

In a step S21 shown in FIG. 19, the control circuit 100 determines whether or not the eject switch 104 has been turned ON. If it is determined in the step S21 that the eject switch 104 is ON, then the process proceeds to a step S22 and the motor 72 is rotatably driven in an eject direction (a direction that is the reverse of the loading direction).

In a step S23, both the second and third detection switches 42 and 44 are checked to determine whether or not they are turned ON. When the main slider 26 is driven by the motor 72 in the Xa direction to the eject position, the second and third detection switches 42 and 44 both turn ON.

If both the second and third detection switches 42 and 44 are ON, then the disk 12 is considered to have moved to an eject position, the process continues to a step S24 and the rotation of the motor 72 ceases. At this point, the disk, which has been moved to the eject position (that is, the disk 12 projects approximately halfway out the insertion slot 50), is withdrawn from the insertion slot 50.

In a step S25, both the first detection switch 36 and the second detection switch 45 are checked to determine whether or not they are turned ON. When the disk 12 is withdrawn from the insertion slot 50, the tip of the arm 20 separates from the first detection switch 36 and the press portion 18Ba of the arm 18 separates from the detection switch 45. In so doing, the first detection switch 36 turns OFF and the detection switch 45 also turns OFF, detecting the withdrawal of the disk 12 from the unit.

Accordingly, in step S25, when both the first detection switch 36 and the detection switch 45 turn OFF, the disk 12 is determined to have been removed from the insertion slot 50 and the process proceeds to a step S26, wherein the motor 72 is rotatably driven further in the eject direction (the direction opposite that of the loading direction).

In a succeeding step S27, the third detection switch 44 is checked to determine whether or not it has turned OFF. As described above, the main slider 26 slides in the Xa direction and the arm 16 is rotated further in the counter-clockwise direction from the eject position, so that the roller 29 supported at the tip of the arm 16 is adjacent to the insertion slot 50.

Thus, the roller 29 enters a disk insertion standby state near the insertion slot 50 and, as shown in FIG. 10A, the cam plate 40 separates from the third detection switch 44, turning the third detection switch 44 OFF. Then, in a step S28, the third detection switch 44 having turned OFF, completion of the movement to a disk insertion standby state is detected and the rotation of the motor 72 is stopped.

Thus, after the disk 12 is removed from the insertion slot 50 and the next disk is inserted, the inserted edge of the disk 12 is engaged by the roller 29 soon after insertion into the insertion slot 50. The inserted leading edge of the disk can be supported and held level before it has a chance to slant downward. As a result, the ease and stability with which the disk is properly inserted into the unit can be improved.

It should be noted that the present invention has been consistently described with reference to a CD-ROM device. However, it should be noted that the present invention is not limited to such a device but can be used with a CD-R, CD-RW, DVD or magneto-optical disk drive unit.

Additionally, in the present embodiment, after the disk 12 is removed from the unit, the motor 72 is rotatably driven so as to drive the arm 16 so as to bring the roller 29 into proximity with the insertion slot 50. However, the present invention is not limited to such an embodiment, and in place of the motor a spring may be used to rotate the arm 16.

The above description is provided in order to enable any person skilled in the art to make and use the invention and sets forth the best mode contemplated by the inventors of carrying out the invention.

The present invention is not limited to the specifically disclosed embodiments, and variations and modifications may be made without departing from the scope and spirit of the present invention.

The present application is based on Japanese Priority Application No. 11-345506 filed on Dec. 3, 1999, Japanese Priority Application No. 2000-324397 filed on Oct. 24, 2000, and Japanese Priority Application No. 2000-358387 filed on Nov. 24, 2000, the contents of which are hereby incorporated by reference.

What is claimed is:

1. A disk loading device comprising:

a slot into which a recording medium in the form of a disk is inserted;

a retaining member that retains the recording medium inserted from the slot;

a moving member that moves the retaining member so as to retract the recording medium in a disk insert direction during insertion and expel the recording medium in a disk eject direction during ejection;

detection means including a plurality of detection switch means for detecting insertion of the recording medium in said slot, movement of the recording medium into an eject position and extraction of the recording medium from said slot; including means for generating an electrical signal that indicates extraction of the recording medium from said slot; and drive means including motor means for controlling said moving member in response to said electrical signal and being responsive to said plurality of detection switch means for causing the moving member to move further in the eject direction after the extraction of the recording medium so as to bring the retaining member adjacent to the slot thereby placing the disk loading device in a disk insertion standby state with the motor means temporarily turned off.

2. The disk loading device as claimed in claim 1, wherein the retaining member comprises:

a first roller that supports an insertion-side edge portion of the disk-like recording medium;

a second roller that supports an ejection-side edge portion of the disk-like recording medium; and a third roller that supports an edge portion of the disk-like recording medium on a side other than the ejection side.

3. The disk loading device as claimed in claim 1, wherein the moving member comprises a first loading arm that supports the first roller;

a second loading arm that supports the second roller; and a third loading arm that supports the third roller.

4. The disk loading device as claimed in claim 1, wherein the drive mechanism, after the disk-like recording medium has moved to the eject position, drives at least the first loading arm from the eject position further in the eject direction so as to bring the retaining member adjacent to the slot as the disk-like recording medium is withdrawn from the slot.

5. A disk drive unit comprising:

a slot into which a recording medium in the form of a disk is inserted;

a retaining member that retains the recording medium inserted from the slot;

a moving member that moves the retaining member so as to retract the recording medium in a disk insert direction during insertion and expel the recording medium in a disk eject direction during ejection;

a turntable that clamps and rotates the inserted recording medium; and a pick-up that reads information recorded on the recording medium rotated by the turntable, detection means for detecting, after the recording medium has moved to an eject position, that the recording medium has been ejected through said slot with said detection means including means for generating an electrical signal that indicates the ejection of the recording medium; and a disk drive unit including motor means for controlling said moving member and a drive mechanism with said motor means being responsive to said electrical signal such that, after the recording medium has been ejected said motor m y continues to drive the moving member further in the eject direction so as to bring the retaining member adjacent to the slot thereby placing the disk loading device in a disk insertion standby state with the motor means temporarily turned off.

* * * * *